United States Patent
Totsuka et al.

(10) Patent No.: US 9,501,842 B2
(45) Date of Patent: Nov. 22, 2016

(54) IMAGE PROCESSING APPARATUS AND IMAGE PROCESSING METHOD WITH COLOR CORRECTION OF OBSERVATION TARGET

(71) Applicant: CANON KABUSHIKI KAISHA, Tokyo (JP)

(72) Inventors: Atsushi Totsuka, Kawasaki (JP); Yoshiko Iida, Tokyo (JP); Jun Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/497,154

(22) Filed: Sep. 25, 2014

(65) Prior Publication Data

US 2015/0110398 A1 Apr. 23, 2015

(30) Foreign Application Priority Data

Oct. 22, 2013 (JP) .................................. 2013-219135
Apr. 14, 2014 (JP) .................................. 2014-082621

(51) Int. Cl.
*G06K 9/00* (2006.01)
*G06T 11/00* (2006.01)
*G06T 5/00* (2006.01)
*H04N 1/60* (2006.01)

(52) U.S. Cl.
CPC ............. *G06T 11/001* (2013.01); *G06T 5/008* (2013.01); *H04N 1/6027* (2013.01); *G06T 2207/10024* (2013.01); *G06T 2207/20104* (2013.01)

(58) Field of Classification Search
None
See application file for complete search history.

(56) References Cited

U.S. PATENT DOCUMENTS

| | | | |
|---|---|---|---|
| 6,995,881 B2 | 2/2006 | Iida et al. | |
| 7,016,530 B2 | 3/2006 | Saito et al. | |
| 7,251,359 B2 | 7/2007 | Iida et al. | |
| 7,315,385 B2 | 1/2008 | Iida et al. | |
| 8,488,052 B2 | 7/2013 | Watanabe | |
| 2004/0109181 A1* | 6/2004 | Suzuki | G06K 15/02 358/1.9 |
| 2008/0043043 A1* | 2/2008 | Thielen | G09G 5/00 345/667 |
| 2008/0055473 A1* | 3/2008 | Osawa | H04N 9/68 348/577 |
| 2012/0044497 A1 | 2/2012 | Totsuka | |
| 2013/0135366 A1* | 5/2013 | Araki | G09G 3/3607 345/690 |

FOREIGN PATENT DOCUMENTS

| | | |
|---|---|---|
| JP | 2007-208629 A | 8/2007 |
| JP | 3988355 B2 | 10/2007 |
| JP | 2007-322850 A | 12/2007 |
| JP | 2009-005097 A | 1/2009 |
| JP | 2009-198951 A | 9/2009 |

\* cited by examiner

*Primary Examiner* — Li Liu
(74) *Attorney, Agent, or Firm* — Fitzpatrick, Cella, Harper & Scinto

(57) ABSTRACT

Provided is an image processing apparatus capable of adjusting a color of an image of an observation target depending on differences between viewing angles. The image processing apparatus obtains a viewing angle of a first observation target and a viewing angle of a second observation target, and then corrects the color of each observation target by using the obtained viewing angles of the first and second observation targets.

12 Claims, 37 Drawing Sheets

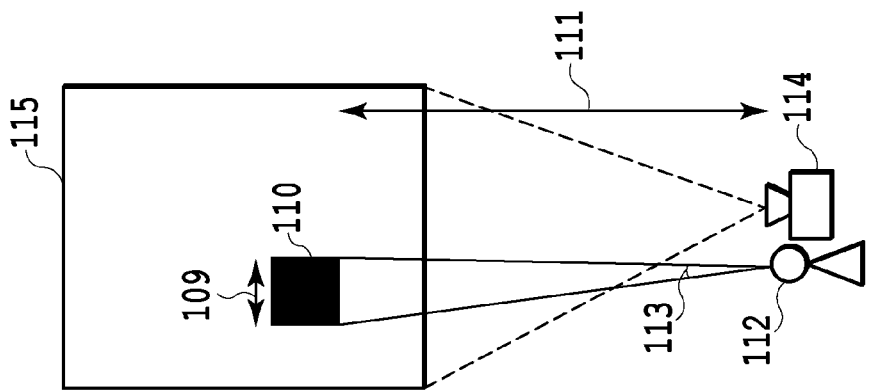
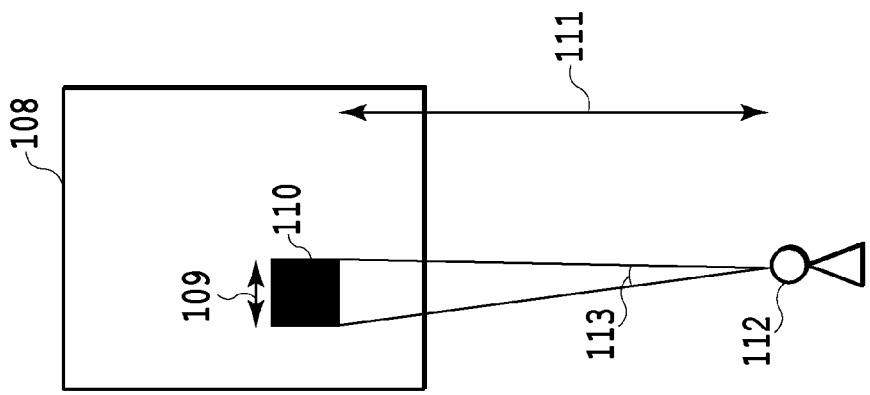
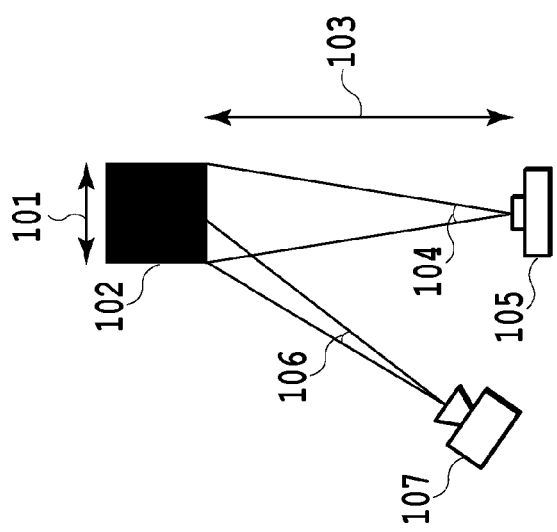

| OBSERVATION VIEWING ANGLE | SATURATION CORRECTION PARAMETER | BRIGHTNESS CORRECTION PARAMETER |
|---|---|---|
| 2 | COEFFICIENT a | TABLE a |
| 5 | COEFFICIENT b | TABLE b |
| 10 | COEFFICIENT c | TABLE c |
| ⋮ | ⋮ | ⋮ |
| 50 | COEFFICIENT e | TABLE e |

FIG.4

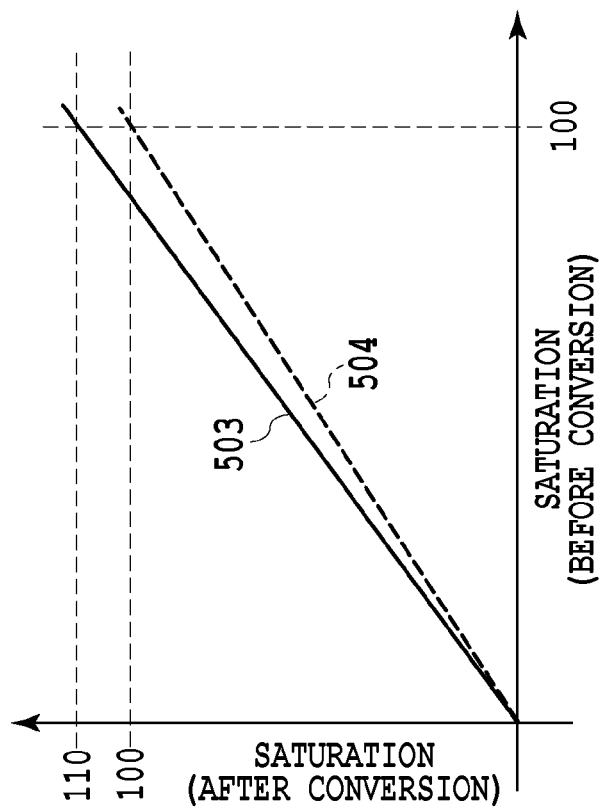
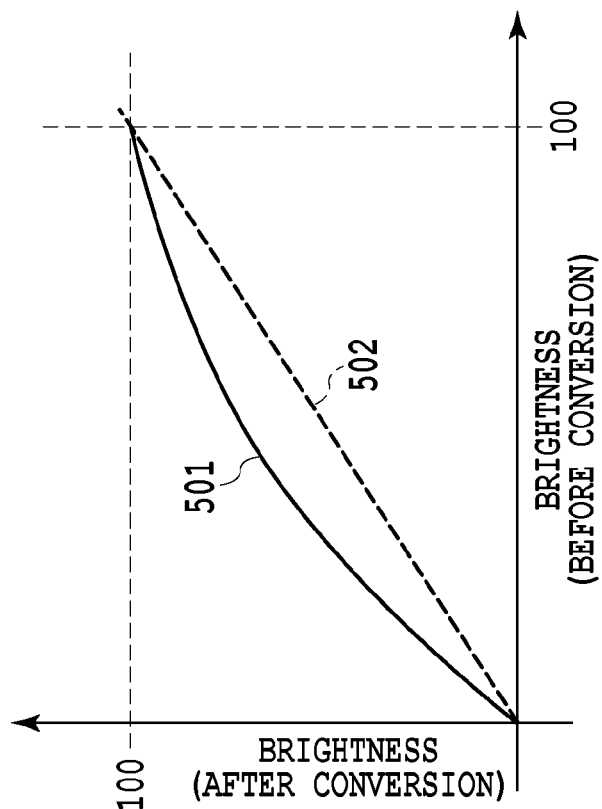
FIG.5A
FIG.5B

| R | G | B | L | C | h |
|---|---|---|---|---|---|
| 0 | 0 | 0 | 6.6 | 1.2 | -22 |
| 0 | 0 | 32 | 8.9 | 14 | -83 |
| . | . | . | . | . | . |
| . | . | . | . | . | . |
| . | . | . | . | . | . |
| . | . | . | . | . | . |
| . | . | . | . | . | . |
| . | . | . | . | . | . |
| 255 | 255 | 255 | 100 | 0 | 0 |

FIG.19

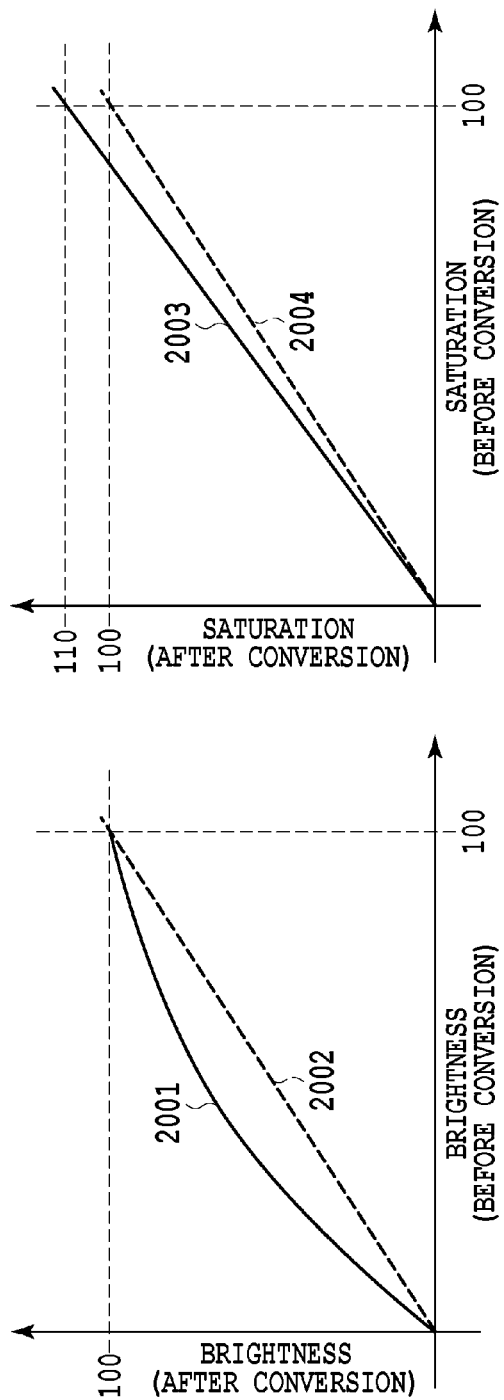

| Rm | Gm | Bm | Rp | Gp | Bp |
|---|---|---|---|---|---|
| 0 | 0 | 0 | 0 | 3 | 3 |
| 0 | 0 | 32 | 1 | 5 | 4 |
| . | . | . | . | . | . |
| . | . | . | . | . | . |
| . | . | . | . | . | . |
| . | . | . | . | . | . |
| . | . | . | . | . | . |
| . | . | . | . | . | . |
| 255 | 255 | 255 | 245 | 255 | 251 |

FIG.21

SETTING SCREEN

MONITOR VISUAL DISTANCE: 50cm

TARGET SCREEN SHORT SIDE: 150cm

SCREEN ASPECT RATIO: 16 : 9

SCREEN VISUAL DISTANCE: 100cm

FIG.30

| TYPE OF BASIC SHAPE | VIEWING ANGLE OF BASIC SHAPE (IN SQUARE) | ASPECT RATIO | CORRECTION COEFFICIENT OF X | CORRECTION COEFFICIENT OF Y | CORRECTION COEFFICIENT OF Z |
|---|---|---|---|---|---|
| 0(RECTANGLE) | 3 DEGREES | 1 : 1 | 1.0 | 1.0 | 1.0 |
| 0(RECTANGLE) | 3 DEGREES | 1 : 4 | 0.96 | 0.97 | 0.97 |
| 0(RECTANGLE) | 3 DEGREES | 1 : 9 | 0.90 | 0.92 | 0.91 |
| ... | ... | ... | ... | ... | ... |
| 0(RECTANGLE) | 22 DEGREES | 1 : 1 | 1.09 | 1.09 | 1.04 |
| 0(RECTANGLE) | 22 DEGREES | 1 : 4 | 1.07 | 1.07 | 1.06 |
| 0(RECTANGLE) | 22 DEGREES | 1 : 9 | 1.05 | 1.06 | 1.04 |
| ... | ... | ... | ... | ... | ... |
| 1(ELLIPSE) | 3 DEGREES | 1 : 1 | 1.01 | 1.01 | 1.01 |
| ... | ... | ... | ... | ... | ... |
| 1(ELLIPSE) | 3 DEGREES | 1 : 1 | 1.10 | 1.10 | 1.05 |
| ... | ... | ... | ... | ... | ... |

FIG.33

IMAGE PROCESSING APPARATUS AND IMAGE PROCESSING METHOD WITH COLOR CORRECTION OF OBSERVATION TARGET

BACKGROUND OF THE INVENTION

1. Field of the Invention

The present invention relates to an image processing apparatus and an image processing method, and more particularly relates to a technique to adjust color reproducibility of an observed image depending on a difference in viewing angle.

2. Description of the Related Art

In a case where an observation target is observed at different viewing angles, a color of the observation target can look different depending on the viewing angle. This is known as an area effect of colors, which is a phenomenon where brightness, saturation and the like of a color look different depending on a viewing angle expressed as a ratio of the size of the observation target to a distance to the observation target in observation. Here, the viewing angle is an angle at which a display of the observation target can be correctly viewed.

In a printed material, for example, a color perceived in an outputted printed material having a large size is higher in saturation and brightness than that in a printed material having a small size. Accordingly, even if printed materials are outputted in the same color (brightness and saturation), the colors in the printed materials different in size cannot be perceived as the same color.

To counter such a problem, Japanese Patent No. 3988355 describes a technique to correct brightness of an output image according to a magnification factor of the output image with respect to an input image. Also, Japanese Patent Laid-Open No. 2007-322850 describes a technique to correct brightness, color and the like of a displayed image according to a viewing angle for observation. Japanese Patent Laid-Open No. 2009-5097 describes adjustment of a color gamut of a display device based on a viewing angle in observation of an image displayed on the display device.

However, the techniques described above are essentially to merely adjust a color in accordance with only the viewing angle of the image to be observed. In other words, these techniques do not consider a difference in viewing angle between two or more observation targets. For this reason, colors of the two or more observation targets may not be observed as the same color.

SUMMARY OF THE INVENTION

An image processing apparatus according to the present invention is an image processing apparatus for adjusting a color of image of an observation target depending on differences between viewing angles of the observation target. The image processing apparatus includes: an obtaining unit configured to obtain a viewing angle of a first observation target and a viewing angle of a second observation target; and a color correction unit configured to correct colors of the observation targets by using the viewing angle of the first observation target and the viewing angle of the second observation target, which are obtained by the obtaining unit.

According to the present invention, colors of observation targets can be adjusted depending on the difference in viewing angle between two or more observation targets.

Further features of the present invention will become apparent from the following description of exemplary embodiments (with reference to the attached drawings).

BRIEF DESCRIPTION OF THE DRAWINGS

FIGS. 1A to 1C are diagrams each illustrating a relationship between a viewing angle and an observer according to Embodiment 1;

FIG. 4 is a diagram illustrating a memory configuration of a color correction data storage unit in the image processing apparatus according to Embodiment 1;

FIGS. 5A and 5B are diagrams illustrating an example of color correction parameters according to Embodiment 1;

FIG. 19 is a diagram illustrating a data format of a device color gamut in Embodiment 2;

FIGS. 20A to 20C are conceptual diagrams for illustrating a change in color gamut with correction parameters in Embodiment 3;

FIG. 21 is a diagram illustrating a data format of a profile in Embodiment 3;

FIG. 30 is a diagram showing a user interface for setting observation information according to Embodiment 6;

FIG. 33 is a table storing a correction amount due to a change in size for each shape according to Embodiment 6;

DESCRIPTION OF THE EMBODIMENTS

Figure 2:
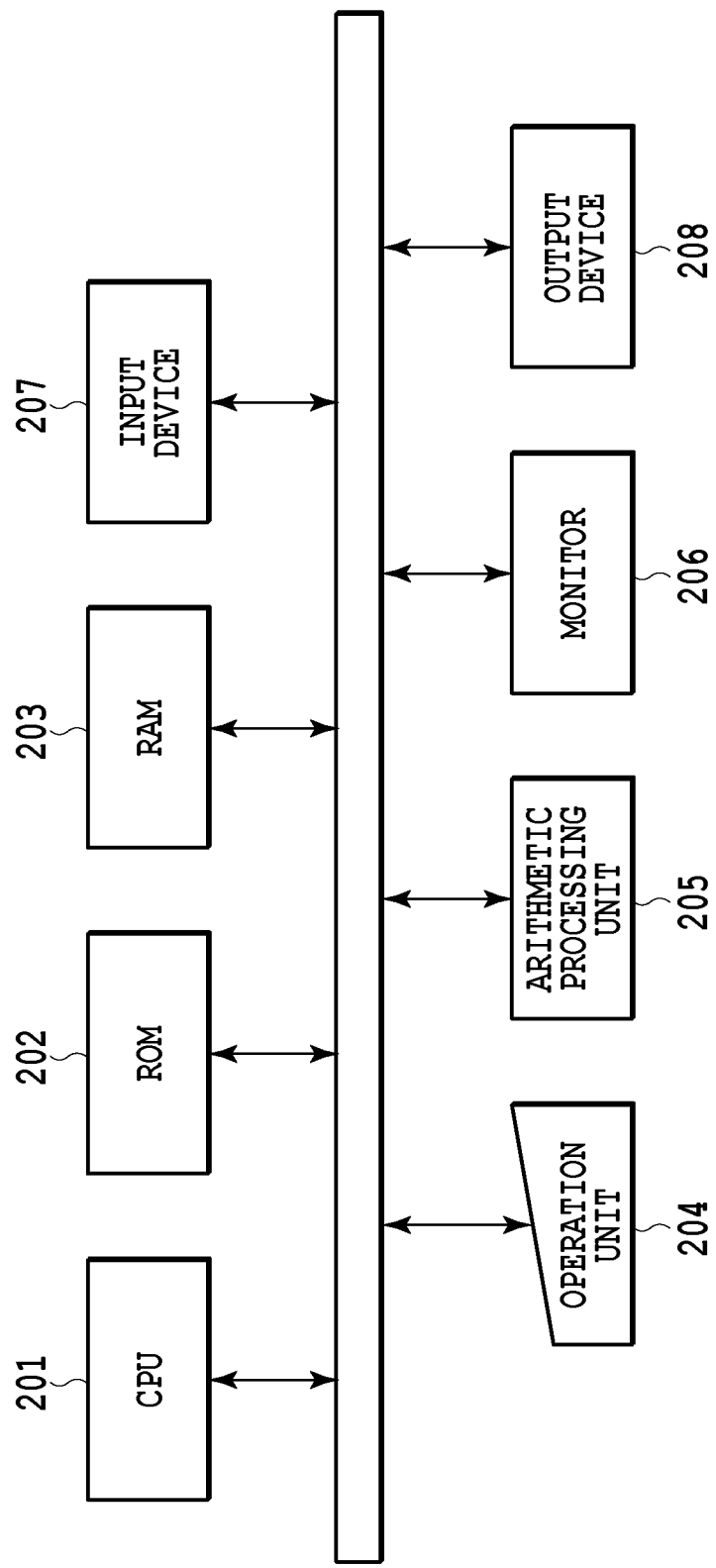
FIG. 2 is a block diagram illustrating a schematic configuration of an image processing apparatus according to Embodiment 1.

Prior to description of an overview and a configuration of an image processing apparatus according to an embodiment, an area effect due to a difference in viewing angle is described.

First, with reference to FIGS. 1A to 1C, description is given of a relationship between an object that is an observation target in this embodiment and an observation viewing angle relative to an object image that is an image indicating the observation target on an output image.

FIGS. 1A to 1C are diagrams illustrating viewing angles according to this embodiment. FIG. 1A shows an example where an observer observes an actual object as the observation target. FIG. 1B shows an example where the observer observes an object image in an output image outputted by a printer. FIG. 1C shows an example where the observer observes an object image in an output image projected by a projector.

In FIG. 1A, an object 102 has an object size 101. As described above, a viewing angle is determined based on the size of the observation target (here, the object 102) and a distance of the observer. In a case where the observer observes the object 102 at a position of a reference distance 103 in FIG. 1A, the observer sees the object 102 by the size of a reference viewing angle 104. Note that the reference distance means a predetermined arbitrary distance. In this embodiment, a captured image is obtained by capturing the object with a camera 105 set at a position of the observer. Therefore, in this embodiment, the reference distance means a distance between the camera 105 and the object 102 during capturing of the object. The reference viewing angle means a viewing angle in observation of the object 102 at the reference distance. In other words, the captured image is an image corresponding to the reference viewing angle that is determined based on the reference distance and the object size 101. Note that capturing conditions for capturing of the captured image may be those that allow calculation of an output size of the object based on the captured image to be described later as well as calculation of a colorimetric value that is a value obtained by measuring colors of the object, an output image or the like.

Note that the colors of the object 102 may be calculated based on the captured image or may be calculated with a colorimeter 107. In a case of using the colorimeter 107, it is defined by CIE (Commission Internationale de l'Eclairage (International Commission on Illumination)) to use 2 degrees or 10 degrees as a measurement viewing angle 106. In other words, a colorimetric value is obtained using the colorimeter 107 at a position where the measurement viewing angle 106 is 2 degrees or 10 degrees. In this embodiment, in the case of using the colorimeter 107, a colorimetric value calculated by setting the measurement viewing angle 106 to 2 degrees is used.

In order to obtain the colors of the object 102, the colorimetric value measured using the colorimeter 107 may be directly inputted. Alternatively, a colorimetric value may be used, which is obtained by converting a pixel value in the captured image of the object into a colorimetric value measured with the colorimeter 107. The processing of obtaining the colorimetric value based on the pixel value in the captured image of the object is realized by using the technique disclosed in Japanese Patent Laid-Open No. 2007-208629, for example.

As shown in FIG. 1A, it is often the case that the reference viewing angle 104 at which the observer observes the object is different from the measurement viewing angle 106 used in the colorimeter 107. In this case, an area effect causes a color perceived by the observer at the reference viewing angle 104 to be different from the colorimetric value obtained with the colorimeter 107.

Next, FIG. 1B shows an example of a case where an observer observes an object image representing an object on a printed image outputted by a printer. The object image is an image obtained by capturing the object 102 shown in FIG. 1A. In a printed material such as a poster and a catalog, for example, the object image is not always reproduced in the same size as the actual object size. To be more specific, in a case where an observer 112 observes an object image 110 at a position of an observation distance 111 from an object image 110 reproduced in an output size 109 on a printed image 108, the observer sees the object image 110 by the size of an observation viewing angle 113. Note that the observation distance means a predetermined arbitrary distance. In this embodiment, the observation distance is a distance between the observer and the object image 110 in an output image such as the printed image or a projected image to be described later. The observation distance is described here as the distance between the object image 110 and the observer, but may be a distance between the output image and the observer. The observation viewing angle is a viewing angle in observation of the object image 110 at the observation distance 111. In other words, the object image 110 is an image corresponding to the observation viewing angle that is determined based on the observation distance 111 and the output size 109.

FIG. 1C shows an example of a case where an observer observes an object image on an image projected by a projector in a case that an output image is the projected image. Note that the same reference numerals are assigned to the observation distance and the observation viewing angle in FIGS. 1B and 1C. However, such use of the same reference numerals is intended to show the same concept and not intended to indicate that the observation distances or observation viewing angles in FIGS. 1B and 1C are equal. As a matter of course, the observation distances or observation viewing angles in FIGS. 1B and 1C may be equal. As shown in FIG. 1B or FIG. 1C, in a case where the reference viewing angle 104 at which the observer 112 observes the object 102 is different from the observation viewing angle 113 at which the observer observes the colors of the object image 110 on the output image, the colors perceived by the observer 112 differ due to the influence of the area effect.

As described above, brightness and saturation vary with the observation viewing angle. Therefore, in order to realize accurate color reproduction, it is required to take the area effect into consideration.

Embodiment 1

Embodiment 1 relates to a mode of correcting colors in an object region in an output image based on a viewing angle in observation of an actual observation target and a viewing angle in observation of an image representing the observation target on the output image. In other words, description is given of a mode using the actual observation target as a first observation target and using an object image in the output image as a second observation target.

With reference to FIG. 2, description is given of an overview and a configuration of an image processing apparatus according to Embodiment 1. FIG. 2 is a block diagram illustrating a schematic configuration of the image processing apparatus according to this embodiment. The image processing apparatus according to this embodiment includes a CPU 201. The CPU 201 performs control according to a control program, an operating system, an application program, a device driver and the like, which are stored in a ROM 202. More specifically, the CPU 201 controls a RAM 203, an operation unit 204, an arithmetic processing unit 205, a monitor 206, an input device 207 and an output device 208.

The RAM 203 is a work area and a temporal retreat area for various control programs and data to be inputted from the operation unit 204. The operation unit 204 performs data input to the input device 207, the output device 208 and the like. The arithmetic processing unit 205 performs arithmetic processing of color correction attributable to an area effect in this embodiment. The monitor 206 displays processing results obtained by the arithmetic processing unit 205, data inputted from the operation unit 204, and the like. The input device 207 includes an image capturing device and a colorimeter 107, while the output device 208 includes a printer to output images, and the like. Alternatively, the output device 208 may correspond to the monitor 206.

Figure 3:
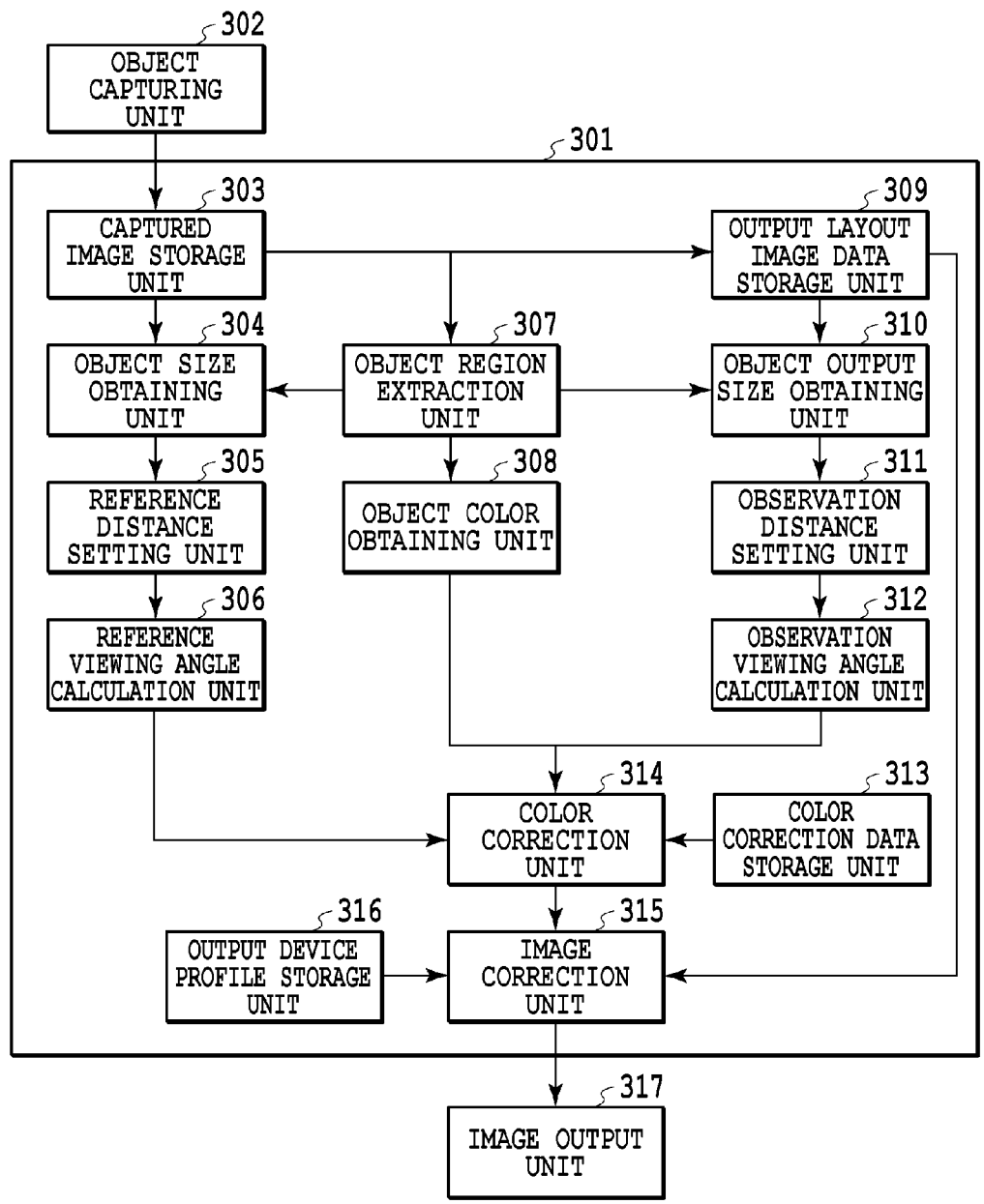
FIG. 3 is a block diagram illustrating an arithmetic processing unit in the image processing apparatus according to Embodiment 1.

FIG. 3 is a block diagram illustrating a color correction processing unit 301 included in the arithmetic processing unit 205 in the image processing apparatus according to this embodiment. With reference to FIG. 3, description is given of a block configuration in color correction processing depending on an observation viewing angle.

The arithmetic processing unit 205 includes the color correction processing unit 301 configured to perform the color correction processing depending on the viewing angle. The image capturing device included in the input device 207 includes an object capturing unit 302 configured to capture an object. The color correction processing unit 301 includes a captured image storage unit 303, an object size obtaining unit 304, a reference distance setting unit 305, a reference viewing angle calculation unit 306, an object region extraction unit 307, an object color obtaining unit 308, an output layout image data storage unit 309, an object output size obtaining unit 310, an observation distance setting unit 311, an observation viewing angle calculation unit 312, a color correction data storage unit 313, a color correction unit 314, an image correction unit 315 and an output device profile storage unit 316.

A captured image obtained by the object capturing unit 302 capturing the object is stored in the captured image storage unit 303. The object size obtaining unit 304 calculates and obtains an actual size W and a capturing distance of the object that is an observation target, based on the captured image and capturing conditions (focus distance, magnification and the like). Here, processing of obtaining the size of the object based on the captured image and the capturing conditions (focus distance, magnification and the like) is realized by using the technique disclosed in Japanese Patent Laid-Open No. 2009-198951, for example. Here, it is assumed that the size of the object is the size of a region extracted as an object region by the object region extraction unit 307 to be described later.

As an example of the viewing angle in this embodiment, assuming a case where the observation target has a rectangular shape, a width of a diagonal line thereof is defined as the object size W and an angle at which an observer 112 sees the object size W is defined as the viewing angle. However, since the object does not always have the rectangular shape, an object size 101 can also be arbitrarily set to obtain an optimum viewing angle according to the shape of the object.

The reference distance setting unit 305 sets a distance at which the observer 112 observes the object as a reference distance D. In this embodiment, a capturing distance of the object is applied as the reference distance. In other words, it is assumed that a position of the observer 112 relative to the object is the same as a position of the image capturing device.

The reference viewing angle calculation unit 306 uses the following Expression 1 to calculate an angle θ of the reference viewing angle 104 that is a viewing angle of the actual object at the position of the observer 112 based on the size W of the object and the reference distance D of the observer 112.

$$\theta = 2\tan^{-1}(W/2D) \qquad \text{(Expression 1)}$$

The object region extraction unit 307 cuts an object region (object image) out of the captured image of the object and the output image. The object size obtaining unit 304 described above uses the cutout object region to obtain the size of the object. The object color obtaining unit 308 performs processing of converting a pixel value of the captured image into a colorimetric value to obtain a colorimetric value of pixels in the object region cut out of the captured image by the object region extraction unit 307.

The output layout image data storage unit 309 stores output layout image data obtained by arranging the object region cut out of the captured image on the output image. In this embodiment, image data to be an output image such as data generated by an image editing application typified by Adobe photoshop is called the output layout image data. Data in Adobe photoshop has a characteristic that a piece of image data is formed by overlapping images called layer images. In this embodiment, it is assumed that layer images included in one piece of output layout image data include a layer image including an image of the object portion cut out of the captured image of the object.

The object output size obtaining unit 310 calculates and obtains an output size 109 of the object portion in the output image to be actually outputted from the output layout image data. Here, a method for calculating the output size 109 is described below.

First, actual horizontal and vertical sizes WPP and WLP of a printed image 108 are obtained by obtaining an output resolution of the output layout image data and the number of pixels in each of longitudinal and lateral directions of the output image or a size of paper to print the output image on. Next, ratios NPT/NPP and NLT/NLP of the numbers of pixels NPP and NLP in longitudinal and lateral directions of the output layout image data to the numbers of pixels NPT and NLT in longitudinal and lateral directions of the object region in the output image extracted by the object region extraction unit 307 are obtained. Then, the actual output sizes of the printed image 108 are multiplied by the obtained ratios to obtain horizontal and vertical sizes WPP·NPT/NPP and WLP·NLT/NLP of the object region on the output image. Thus, an actual object size Wt on the output image is calculated by (Expression 2).

$$Wt = \sqrt{[\{WPP(NPT/NPP)\} \cdot \{WPP(NPT/NPP)\} + \{WLP(NLT/NLP)\} \cdot \{WLP(NLT/NLP)\}]}$$ (Expression 2)

The observation distance setting unit 311 sets a distance at which the observer 112 observes the object portion on the output image as an observation distance D1. The observation distance is used to define an observation viewing angle at which the observer 112 observes the object portion on the output image.

The observation viewing angle calculation unit 312 applies the size Wt of the object region on the output image and the observation distance D1 of the observer 112 to Expression 1. After applying the observation distance D1, the observation viewing angle calculation unit 312 calculates an angle θ1 of an observation viewing angle 113 of the object region on the output image for the observer 112 in the same manner as the angle θ of the reference viewing angle 104.

Thus, a difference in color hue attributable to a difference in viewing angle can be properly corrected as described later by using the reference viewing angle 104 and observation viewing angle 113 thus calculated.

The color correction data storage unit 313 stores correction parameters for chromaticity corresponding to a change in viewing angle. The chromaticity includes saturation and brightness. The correction parameters are described later. The color correction unit 314 calculates a reproduction chromaticity value of the object on the output image by referring to the correction parameters stored in the color correction data storage unit 313, based on the reference viewing angle 104, the colorimetric value of the object and the observation viewing angle 113. The image correction unit 315 corrects the pixel value of the pixels in the object region on the output layout image data. More specifically, the image correction unit 315 converts the pixel value of the image by referring to an output device profile so as to reproduce the reproduction chromaticity value calculated by the color correction unit 314. Here, the output device profile is a look-up table that uses the chromaticity value as an input index and outputs a pixel value of an output device. The output device profile storage unit 316 stores a profile including data described about a correspondence relationship between a pixel value and a chromaticity value to be reproduced in an image to be outputted by the output device.

The image output unit 317 included in the output device 208 outputs the corrected image data.

Next, description is given of a color correction processing method for the object depending on the observation viewing angle in a case where the color of the object 102 actually observed by the observer 112 at the reference viewing angle 104 shown in FIG. 1A is reproduced as the color of the object on the output image shown in FIG. 1B or FIG. 1C.

FIG. 4 is a table illustrating a memory configuration 401 of the color correction data storage unit 313 in this embodiment. In the color correction data storage unit 313, brightness correction parameters and saturation correction parameters depending on the viewing angle as shown in FIG. 4 are held as correction parameters. Here, the correction parameters are parameters for correcting saturation and brightness depending on the viewing angle. The brightness correction parameters mean a brightness correction table describing correction coefficients for respective levels of brightness. The saturation correction parameters mean constant coefficients regardless of saturation. If there is no correction parameter for a certain viewing angle in the color correction data storage unit 313, the corresponding correction parameter can be calculated and generated by interpolating a correction parameter of another viewing angle. The correction parameters described above do not have to be limited to the format shown in FIG. 4 but may have a correction coefficient for each hue, for example. Furthermore, color conversion functions having variables related to the viewing angle may be used rather than the correction parameters. The functions may be held instead of the correction parameters.

FIGS. 5A and 5B are graphs, each illustrating an example of color correction parameters according to this embodiment. FIG. 5A shows an example of a curve for brightness as a correction parameter at an arbitrary viewing angle. FIG. 5B shows an example of a line for saturation as a correction parameter at an arbitrary viewing angle.

In FIG. 5A, the horizontal and vertical axes represent brightness at a 2-degree viewing angle. As described above, the 2-degree viewing angle means the measurement viewing angle 106, i.e., the viewing angle used in obtaining a colorimetric value. Dotted line 502 indicates brightness at the 2-degree viewing angle. Solid line 501 indicates a relationship between input brightness and brightness perceived by the observer 112 at a viewing angle larger than the 2-degree viewing angle. As the brightness increases, a difference between brightness before color conversion and brightness after the conversion once increases. However, as the brightness further increases, the brightness difference between before and after the color conversion starts to shrink. Although FIG. 5A shows an example of two viewing angles, the brightness correction table shown in FIG. 4 shows curves as shown in FIG. 5A depending on each viewing angle.

Likewise, in FIG. 5B, the horizontal and vertical axes indicate saturation at the 2-degree viewing angle. Dotted line 504 indicates the saturation at the 2-degree viewing angle. Solid line 503 indicates a relationship between input saturation and saturation perceived by the observer 112 at a viewing angle larger than the 2-degree viewing angle. As the saturation increases, a difference between saturation before color conversion and saturation after the conversion gradually increases, and the saturation after the conversion has a large value. Although FIG. 5B shows an example of two viewing angles, the saturation correction table shown in FIG. 4 includes coefficients indicating lines as shown in FIG. 5B depending on each viewing angle.

Figure 6:
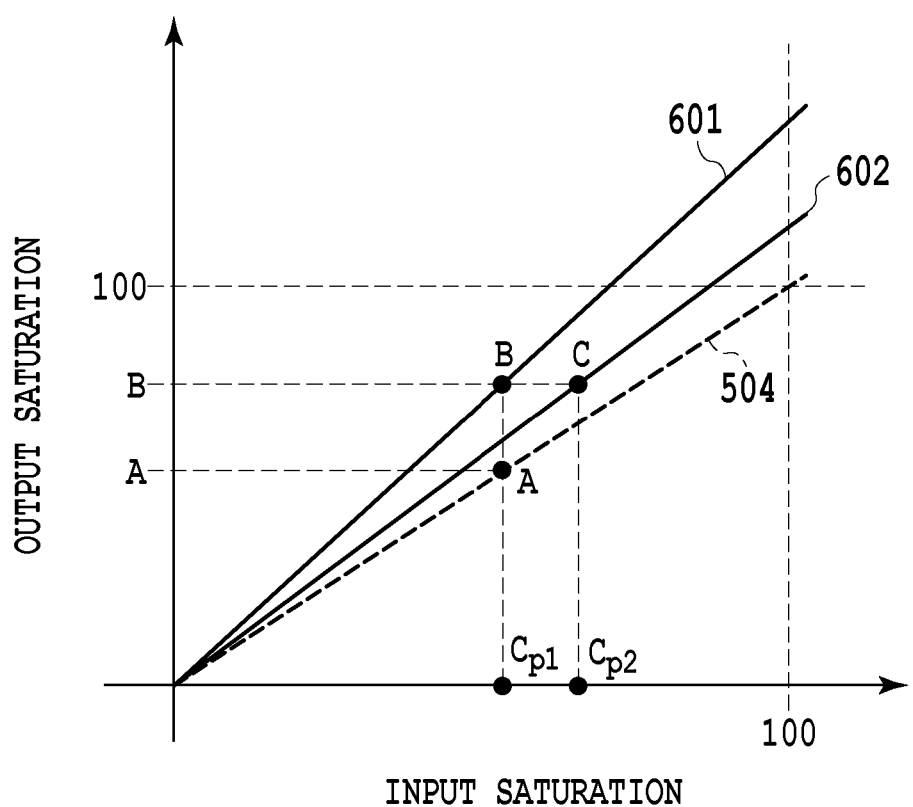
FIG. 6 is a diagram illustrating a relationship between a difference in viewing angle and saturation to be perceived according to Embodiment 1.

With reference to FIG. 6, detailed description is given of a color correction algorithm corresponding to a viewing angle according to this embodiment.

FIG. 6 is a graph illustrating a relationship between a difference in viewing angle and saturation to be perceived according to this embodiment. FIG. 6 shows a relationship between saturations perceived at the reference viewing angle 104 and the observation viewing angle 113 shown in FIGS. 1A to 1C. In other words, FIG. 6 shows a relationship between saturations perceived at the viewing angle in a case of actual observation of an object and at the viewing angle in a case of observation of an image showing the object. Dotted line 504 is the line segment shown in FIG. 5B, indicating the saturation at the 2-degree viewing angle. As described above, the 2-degree viewing angle corresponds to the measurement viewing angle 106 shown in FIG. 1A in this embodiment. Therefore, dotted line 504 indicates correspondence between input saturation at the measurement viewing angle 106 and output saturation at the measurement viewing angle 106. Solid line 601 indicates a correspondence relationship between the input saturation at the measurement viewing angle 106 and output saturation perceived at the reference viewing angle 104. Solid line 602 indicates a correspondence relationship between the input saturation at the measurement viewing angle 106 and output saturation perceived at the observation viewing angle 113. Note that dotted line 504, solid line 601 and solid line 602 coincide with the correction parameters at each viewing angle stored in the color correction data storage unit 313.

The output saturation at which saturation Cp1 at a colorimetric value of an arbitrary object is perceived at the measurement viewing angle 106 by the observer 112 takes a value of point A. Also, the output saturation at which saturation Cp1 is perceived at the reference viewing angle 104 takes a value of point B. Next, in a case where the value of point B, which is the saturation perceived at the reference viewing angle 104 by the observer 112, is observed with the same saturation at the observation viewing angle 113, the value has to be that of point C of saturation on solid line 602. Note that it can be seen that the saturation at the measurement viewing angle 106 at point C of saturation corresponds to saturation Cp2. More specifically, in order to enable the saturation observed at the reference viewing angle 104 to be observed at the observation viewing angle 113, saturation Cp1 may be converted to saturation Cp2. This conversion is also the same for the brightness.

The above processing can also be said as follows. It is assumed that a colorimetric value measured by a colorimeter or the like in a certain region of a captured image is a first value. In this event, a second value is obtained, which is perceived at the reference viewing angle 104 in a case of outputting the first value. Then, a third value is obtained, which is required to be perceived as the second value at the observation viewing angle 113. Thereafter, a fourth value is obtained by converting the third value into a colorimetric value. In this way, the first value of chromaticity in the object region on the output image is converted sequentially into the fourth value. This processing can allow the color perceived in the object region on the output image to approximate the color perceived in observation of the object (i.e., the color of the captured image). As described above, the parameters used in obtaining the second value from the first value, the third value from the second value and the fourth value from the third value are called color correction parameters. As described above, the correction parameters are stored corresponding to the viewing angle. In the following description, it is assumed that the color correction parameters are parameters used in performing actual color conversion processing using the correction parameters. As a matter of course, the color conversion may be performed using only the correction parameters without calculating the color correction parameters. Here, for easier understanding of the embodiment, description is given using separate concepts of the correction parameters and the color correction parameters. As described above, in this embodiment, the color correction parameters between the viewing angles are used, rather than simply performing color correction using the correction parameters corresponding to the viewing angle. This processing allows a color perceived in observation of a first observation target to approximate a color perceived in observation of a second observation target.

According to the conversion order described above, the processing is performed using the color correction parameters between the measurement viewing angle 106 and the reference viewing angle 104, the color correction parameters between the reference viewing angle 104 and the observation viewing angle 113 and the color correction parameters between the observation viewing angle 113 and the measurement viewing angle 106. Thus, the color correction depending on the viewing angle in this embodiment is realized.

(Interface Screen)

Figure 7:
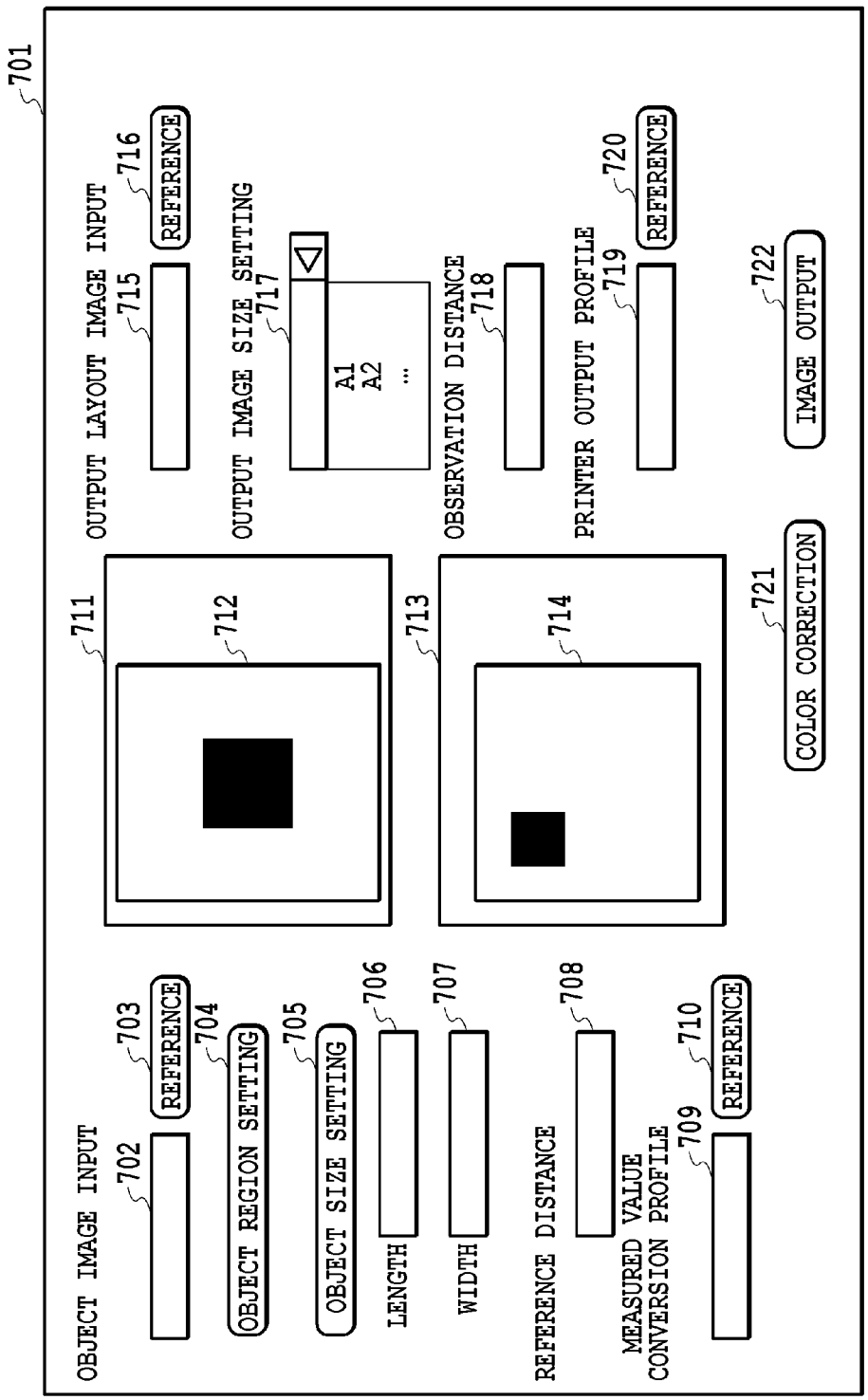
FIG. 7 is a diagram illustrating an example of a UI according to Embodiment 1.

FIG. 7 is a diagram illustrating a user interface (hereinafter referred to as UI) UI 701 displayed on the monitor 206 to carry out the color correction processing depending on the viewing angle in a case of outputting an output image by a printer. With reference to FIG. 7, description is given of operation procedures of the UI 701 to output the output image.

In the UI 701, a reference button 701 is disposed to enter a file name of a captured image in a text box 702. In this embodiment, capturing conditions are described in tab information of an image. The respective capturing conditions are obtained by analyzing the tab information in the arithmetic processing unit 205. Note that an embodiment may be implemented, in which the capturing conditions are inputted using a UI (not shown) different from the UI 701.

By a user operating an object region setting button 704, an object region is extracted from the captured image. The object region may be extracted by the user specifying a predetermined region in the captured image with a mouse or the like, or may be extracted by input of coordinates or the like. By the user operating an object size setting button 705, an object size is calculated based on the object region in the captured image and capturing conditions. The calculated object size is displayed in a text box 706 and a text box 707. In a text box 708, a reference distance in observation of the object is entered. In a case where a capturing distance is the reference distance, the reference distance may be automatically entered in the text box 708 from the capturing conditions. There is also provided a reference button 710 to enter, in a text box 709, a colorimetric value conversion profile for converting a pixel value in the captured image into a colorimetric value. The use of the colorimetric value conversion profile enables the pixel value in the captured image to be converted into a colorimetric value at a measurement viewing angle. The colorimetric value conversion profile includes a conversion table to convert an RGB value, for example, into a value such as a Lab value specified by CIE.

A display unit 711 displays an inputted captured image 712 of the object. A display unit 713 displays an output layout image 714.

There is provided a reference button 716 to enter a file name of the output layout image in a text box 715. The user enters an output paper size for the output image by operating a drop-down list button 717, and also enters an observation distance 111 to observe the output image in a text box 718. Although not shown in FIG. 7, the object region set using the object region setting button 704 is extracted from the output layout image, and a size of an object image is determined based on the entered output paper size.

In the UI 701, there is also provided a reference button 720 to enter, in a text box 719, an output device profile for converting a colorimetric value in the output image into a pixel value to reproduce a desired chromaticity value. By operating a color correction button 721, color correction processing depending on the viewing angle is performed.

Note that the display unit 713 may be configured to alternately display the color of the object region on the displayed output layout image 714 and a corrected color, thereby showing the effect of the processing to the user. As the user operates an image output button 722, an output image subjected to the color correction processing depending on the viewing angle is outputted by the printer.

Figure 8:
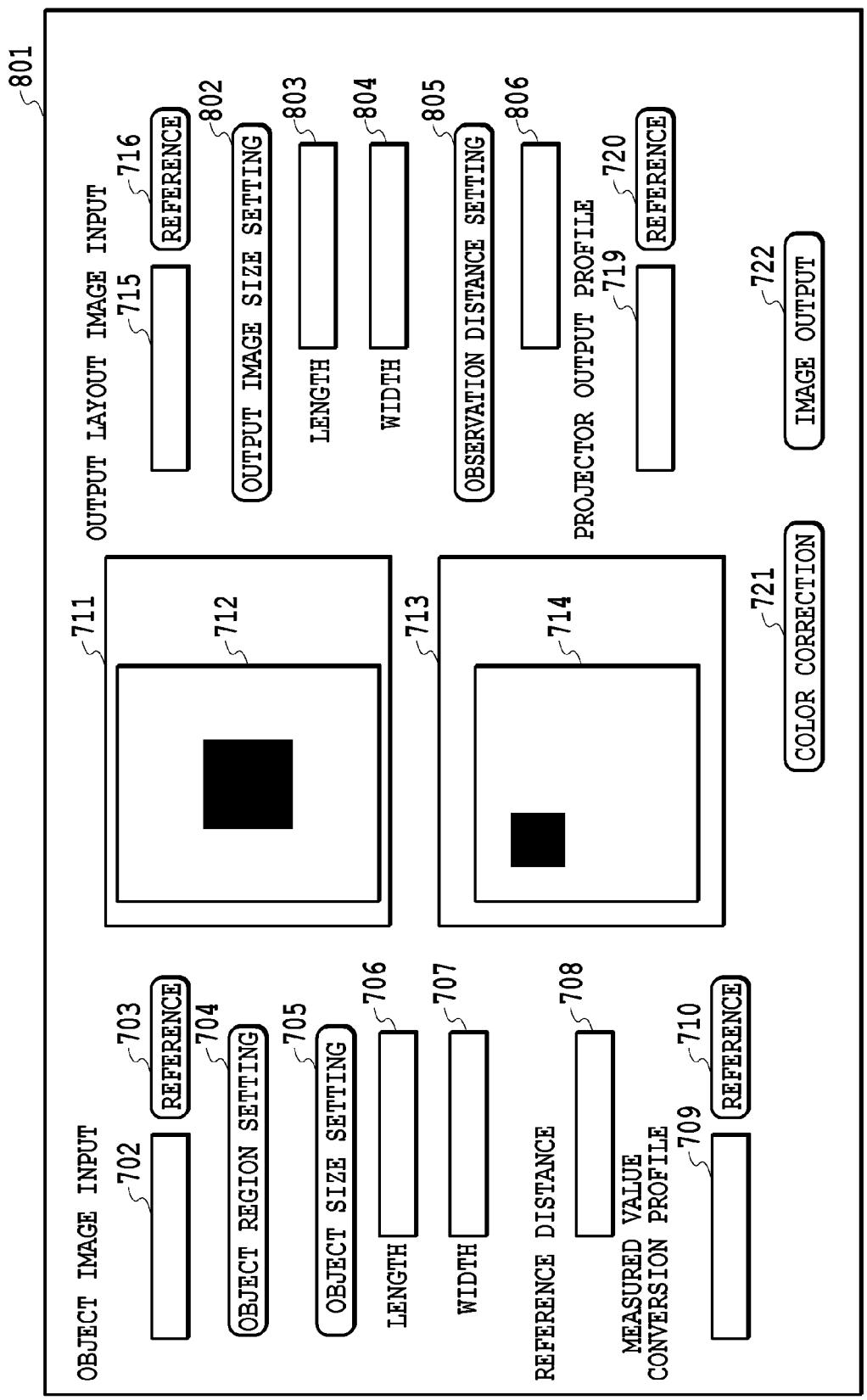
FIG. 8 is a diagram illustrating an example of a UI according to Embodiment 1.

FIG. 8 is a diagram illustrating a UI 801 to be displayed to the user for carrying out color correction processing depending on the viewing angle in a case where the output device 208 is a projector 114 including a distance sensor. With reference to FIG. 8, description is given of operation procedures of the UI 801 to output an output image. Note that the same components as those in the UI shown in FIG. 7 are denoted by the same reference numerals, and description thereof is omitted.

As the user operates an output image size setting button 802, the distance sensor in the projector is operated to measure a distance between a screen and the projector, thereby calculating an output image size corresponding to a measurement distance. The calculated output image size is displayed in a text box 803 and a text box 804.

As the user operates an observation distance setting button 805, the distance sensor in the projector is operated. In a case where the distance between the screen and the projector is the same as an observation distance of the observer, a distance measured by the distance sensor is entered as the observation distance in a text box 806. Note that, in a case where the distance between the screen and the projector is different from a distance between the observer and the screen, the observation distance can be directly entered in the text box 806.

As described above, the color correction depending on the viewing angle is realized by the UI 701 or the UI 801.

Figure 9:
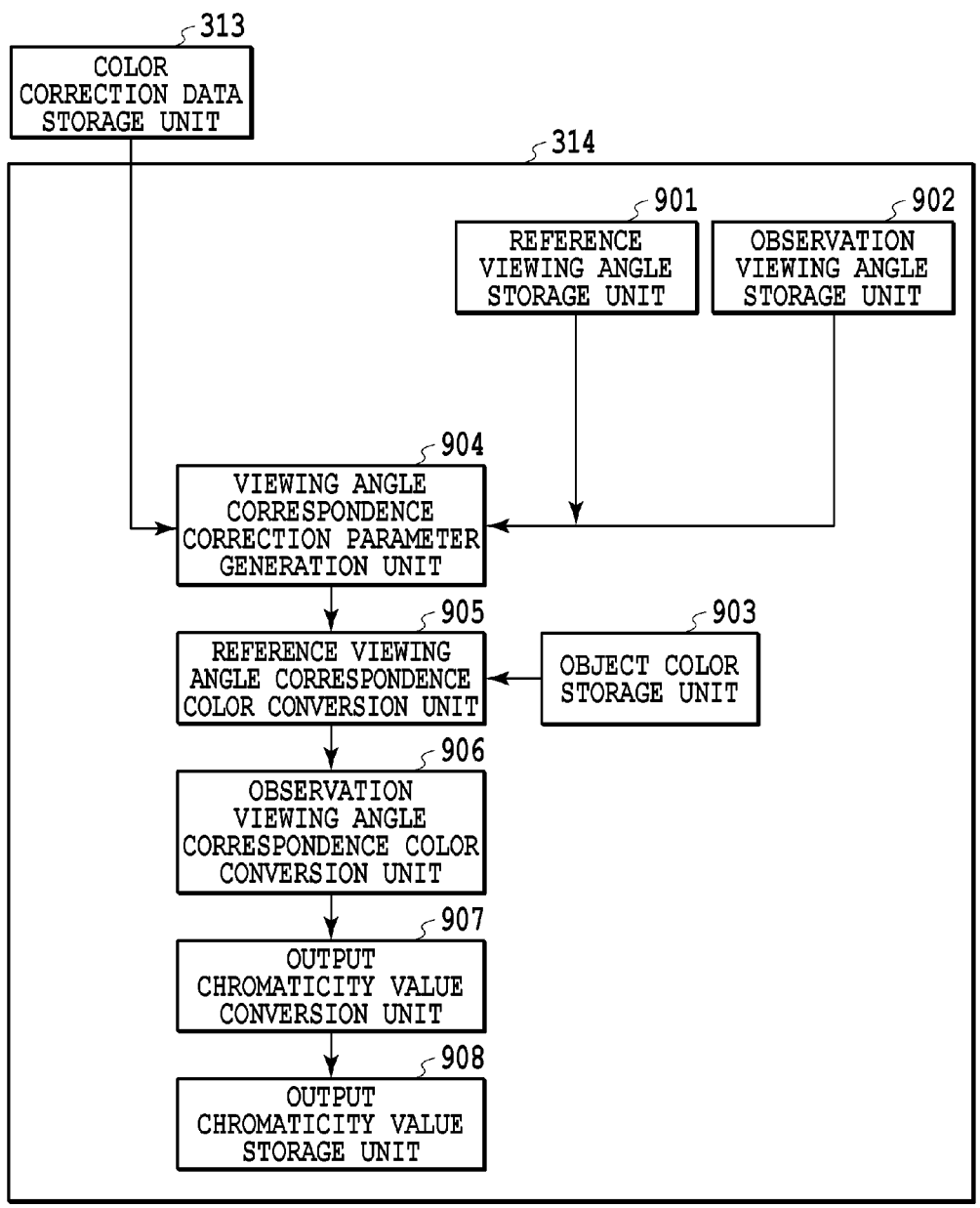
FIG. 9 is a block diagram illustrating a color correction unit in the image processing apparatus according to Embodiment 1.

FIG. 9 is a block diagram illustrating the color correction unit 314 in the image processing apparatus according to this embodiment. With reference to FIG. 9, a block configuration of the color correction unit 314 is described.

The color correction unit 314 in the image processing apparatus according to this embodiment includes a reference viewing angle storage unit 901, an observation viewing angle storage unit 902, an object color storage unit 903, a viewing angle correspondence correction parameter generation unit 904, a reference viewing angle correspondence color conversion unit 905, an observation viewing angle correspondence color conversion unit 906, an output chromaticity value conversion unit 907 and an output chromaticity value storage unit 908.

The reference viewing angle storage unit 901 stores the calculated reference viewing angle 104. The observation viewing angle storage unit 902 stores the calculated observation viewing angle 113. The object color storage unit 903 stores a colorimetric value of the object, which is calculated from the captured image.

The viewing angle correspondence correction parameter generation unit 904 obtains correction parameters corresponding to the measurement viewing angle 106, the reference viewing angle 104 and the observation viewing angle 113 from the color correction data storage unit 313 by referring to the measurement viewing angle 106, the reference viewing angle 104 and the observation viewing angle 113. In a case where there is no correction parameter corresponding to each viewing angle in the color correction data storage unit 313, the corresponding correction parameter is calculated and generated by interpolating a correction parameter of another viewing angle. The viewing angle correspondence correction parameter generation unit 904 uses the obtained correction parameters to generate color correction parameters for correcting chromaticities between the measurement viewing angle 106 and the reference viewing angle 104, between the reference viewing angle 104 and the observation viewing angle 113 and between the observation viewing angle 113 and the measurement viewing angle 106.

The reference viewing angle correspondence color conversion unit 905 obtains saturation and brightness among the colorimetric values of the object stored in the object color storage unit 903. Then, the reference viewing angle correspondence color conversion unit 905 uses the color correction parameters between the measurement viewing angle 106 and the reference viewing angle 104 to convert the saturation and brightness among the colorimetric values of the object into saturation and brightness at the reference viewing angle 104.

The observation viewing angle correspondence color conversion unit 906 uses the color correction parameters between the reference viewing angle 104 and the observation viewing angle 113 to convert the saturation and brightness at the reference viewing angle 104, which are converted by the reference viewing angle correspondence color conversion unit 905, into saturation and brightness at the observation viewing angle 113.

The output chromaticity value conversion unit 907 uses the color correction parameters between the observation viewing angle 113 and the measurement viewing angle 106 to convert the saturation and brightness at the observation viewing angle 113, which are converted by the observation viewing angle correspondence color conversion unit 906, into saturation and brightness at the measurement viewing angle 106. The output chromaticity value conversion unit 907 also converts the converted saturation and brightness at the measurement viewing angle 106 and the hue of the colorimetric value into chromaticity values, and sets the values as output chromaticity values. The output chromaticity value storage unit 908 stores the output chromaticity values converted by the output chromaticity value conversion unit 907.

Figure 10:
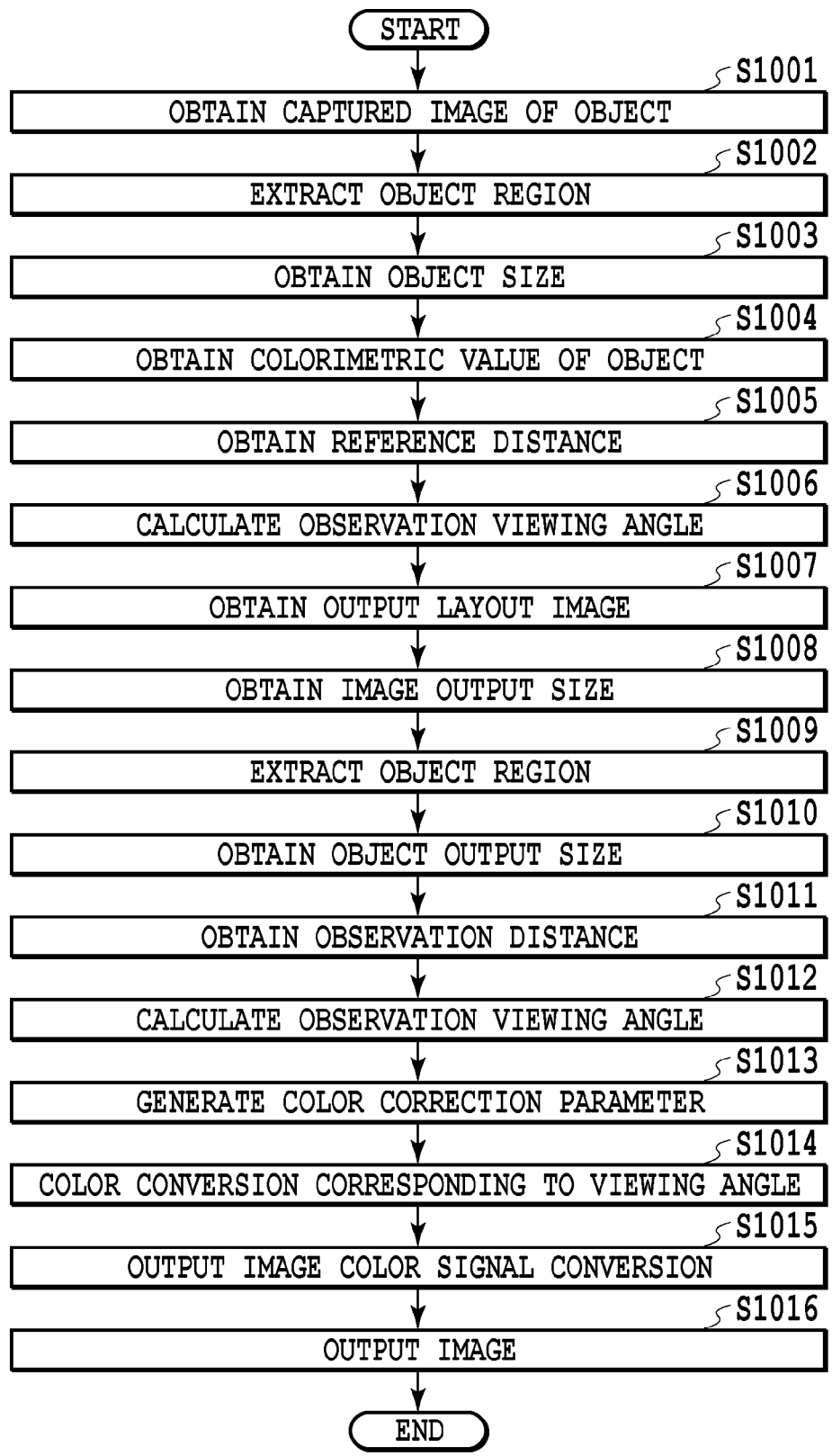
FIG. 10 is a flowchart illustrating overall processing of the image processing apparatus according to Embodiment 1.

FIG. 10 is a flowchart illustrating overall processing of the image processing apparatus according to this embodiment. With reference to FIG. 10, description is given of an overall processing flow of the image processing apparatus according to this embodiment.

In Step S1001, the object capturing unit 302 obtains a captured image of the object 102. In Step S1002, the object region extraction unit 307 extracts an object region from the obtained captured image. In Step S1003, the object size obtaining unit 304 calculates and obtains an object size 101 of the object region from the obtained captured image. In Step S1004, the object color obtaining unit 308 converts a pixel value of the object region in the obtained captured image into a colorimetric value. In Step S1005, the reference distance setting unit 305 obtains and sets a reference distance 103 of the object 102. In Step S1006, the reference viewing angle calculation unit 306 calculates a reference viewing angle 104 of the object 102 having the size calculated.

In Step S1007, the output layout image data storage unit 309 obtains and stores an output layout image laid out to output the obtained captured image. In Step S1008, the object output size obtaining unit 310 obtains a size of the obtained output layout image to be outputted by the image output unit 317. In Step S1009, the object region extraction unit 307 extracts an object region from the obtained output layout image. In Step S1010, the object output size obtaining unit 310 obtains an output size 109 of the object region in the output image. In Step S1011, the observation distance setting unit 311 obtains and sets an observation distance 111 of the output image. In Step S1012, the observation viewing angle calculation unit 312 calculates an observation viewing angle 113 of the object region on the output image, based on the obtained output size 109 and the observation distance 111 of the output image.

In Step S1013, the color correction unit 314 generates color correction parameters corresponding to the reference viewing angle 104, the observation viewing angle 113 and the measurement viewing angle 106. In Step S1014, the color correction unit 314 uses the color correction parameters generated in Step S1013 to convert the colorimetric value of the object region on the output image into an output chromaticity value. In Step S1015, the image correction unit 315 uses an output device profile to convert the output chromaticity value of the object region on the output image subjected to the color correction processing in Step S1014 into a pixel value corresponding to an output device. In Step S1016, the image output unit 317 uses the pixel value converted in Step S1015 to output an image.

Figure 11:
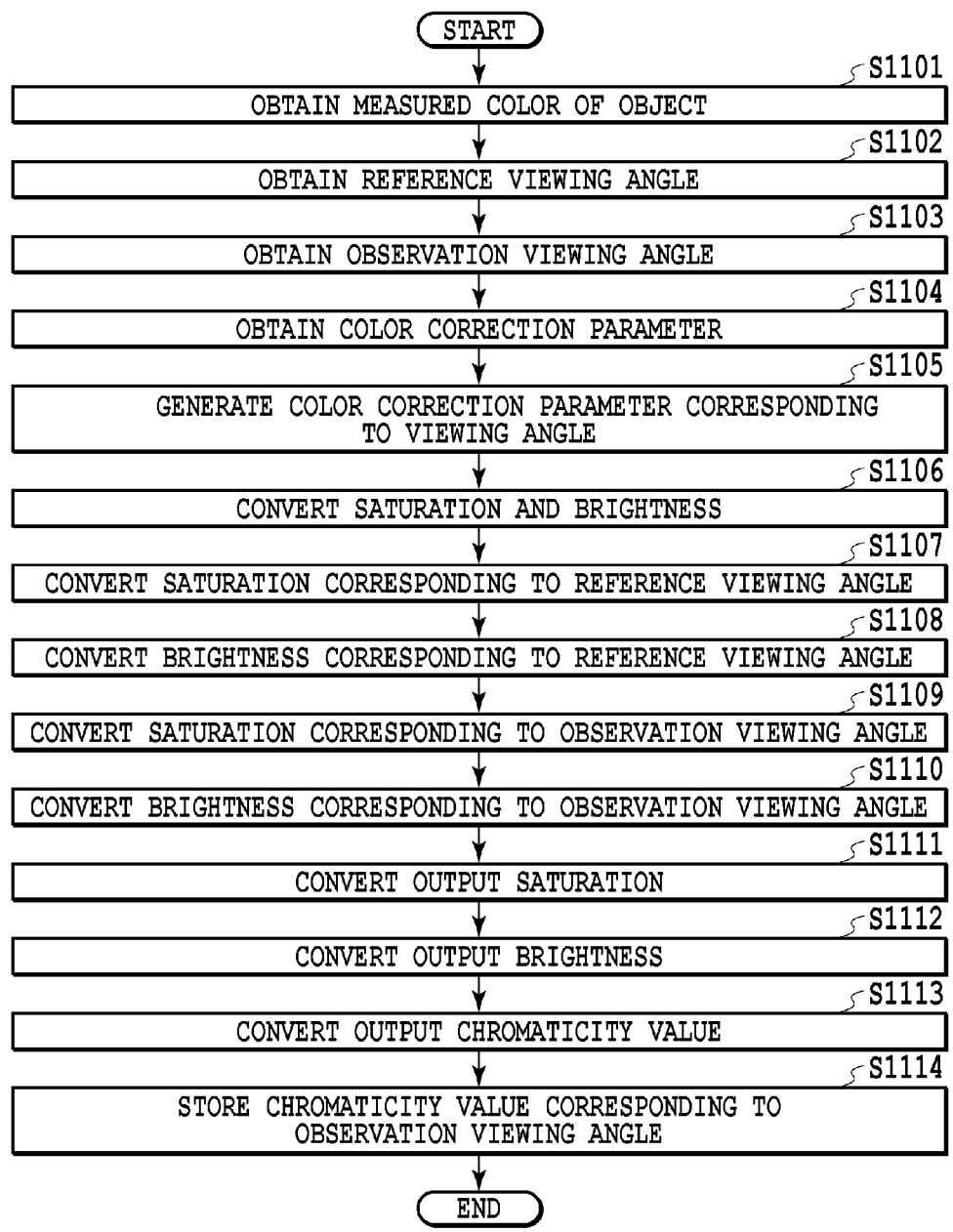
FIG. 11 is a flowchart illustrating color correction processing in the image processing apparatus according to Embodiment 1.

FIG. 11 is a flowchart illustrating color correction processing in the image processing apparatus according to this embodiment. With reference to FIG. 11, description is given of a color correction processing flow depending on the viewing angle in the image processing apparatus according to this embodiment.

In Step S1101, the object color storage unit 903 obtains and stores the colorimetric value of the object, which is converted from the pixel value of the captured image of the object. In Step S1102, the reference viewing angle storage unit 901 obtains and stores the reference viewing angle 104 of the object 102. In Step S1103, the observation viewing angle storage unit 902 obtains and stores the observation viewing angle 113 of the object region on the output image.

In Step S1104, the viewing angle correspondence correction parameter generation unit 904 obtains correction parameters corresponding to the measurement viewing angle 106, the reference viewing angle 104 and the observation viewing angle 113. In Step S1105, the viewing angle correspondence correction parameter generation unit 904 generates color correction parameters between the measurement viewing angle 106 and the reference viewing angle 104, between the reference viewing angle 104 and the observation viewing angle 113 and between the observation viewing angle 113 and the measurement viewing angle 106.

In Step S1106, the reference viewing angle correspondence color conversion unit 905 converts the colorimetric value of the object 102 in the captured image into saturation and brightness. In Step S1107, the reference viewing angle correspondence color conversion unit 905 uses the color correction parameters of the saturation between the measurement viewing angle 106 and the reference viewing angle 104 to convert the saturation in the colorimetric value of the object 102.

In Step S1108, the reference viewing angle correspondence color conversion unit 905 uses the color correction parameters of the brightness between the measurement viewing angle 106 and the reference viewing angle 104 to convert the brightness in the colorimetric value of the object 102.

In Step S1109, the observation viewing angle correspondence color conversion unit 906 uses the color correction parameters of the saturation between the reference viewing angle 104 and the observation viewing angle 113 to convert the saturation converted in Step S1107 into saturation at the observation viewing angle 113.

In Step S1110, the observation viewing angle correspondence color conversion unit 906 uses the color correction parameters of the brightness between the reference viewing angle 104 and the observation viewing angle 113 to convert the brightness converted in Step S1108 into brightness at the observation viewing angle 113.

In Step S1111, the observation viewing angle correspondence color conversion unit 906 uses the color correction parameters of the saturation between the observation viewing angle 113 and the measurement viewing angle 106 to convert the saturation at the observation viewing angle, which is converted in Step S1109, into saturation at the measurement viewing angle 106.

In Step S1112, the observation viewing angle correspondence color conversion unit 906 uses the color correction parameters of the brightness between the observation viewing angle 113 and the measurement viewing angle 106 to convert the brightness at the observation viewing angle, which is converted in Step S1110, into brightness at the measurement viewing angle 106.

In Step S1113, the output chromaticity value conversion unit 907 converts the saturation and brightness at the measurement viewing angle 106, which are converted in Steps S1111 and S1112, and the hue of the colorimetric value of the object 102 into a chromaticity value.

In Step S1114, the output chromaticity value storage unit 908 stores the chromaticity value converted in Step S1113 as an output chromaticity value in the object region on the output image.

As described above, according to this embodiment, accurate color correction of the object depending on the viewing angle can be realized by correcting the color hue attributable to the area effect based on the actual object and the size of the object reproduced on the output image.

Embodiment 2

In Embodiment 1, the description is given of the color correction processing in the case where the reference viewing angle 104 is different from the observation viewing angle 113. Here, in a case where the reference viewing angle 104 coincides with the observation viewing angle 113, it is inefficient to execute the color correction processing flow in Embodiment 1, since the flow includes unnecessary steps. Therefore, in Embodiment 2, description is given of color processing in a case where the reference viewing angle 104 coincides with the observation viewing angle 113 in Embodiment 1.

Figure 12:
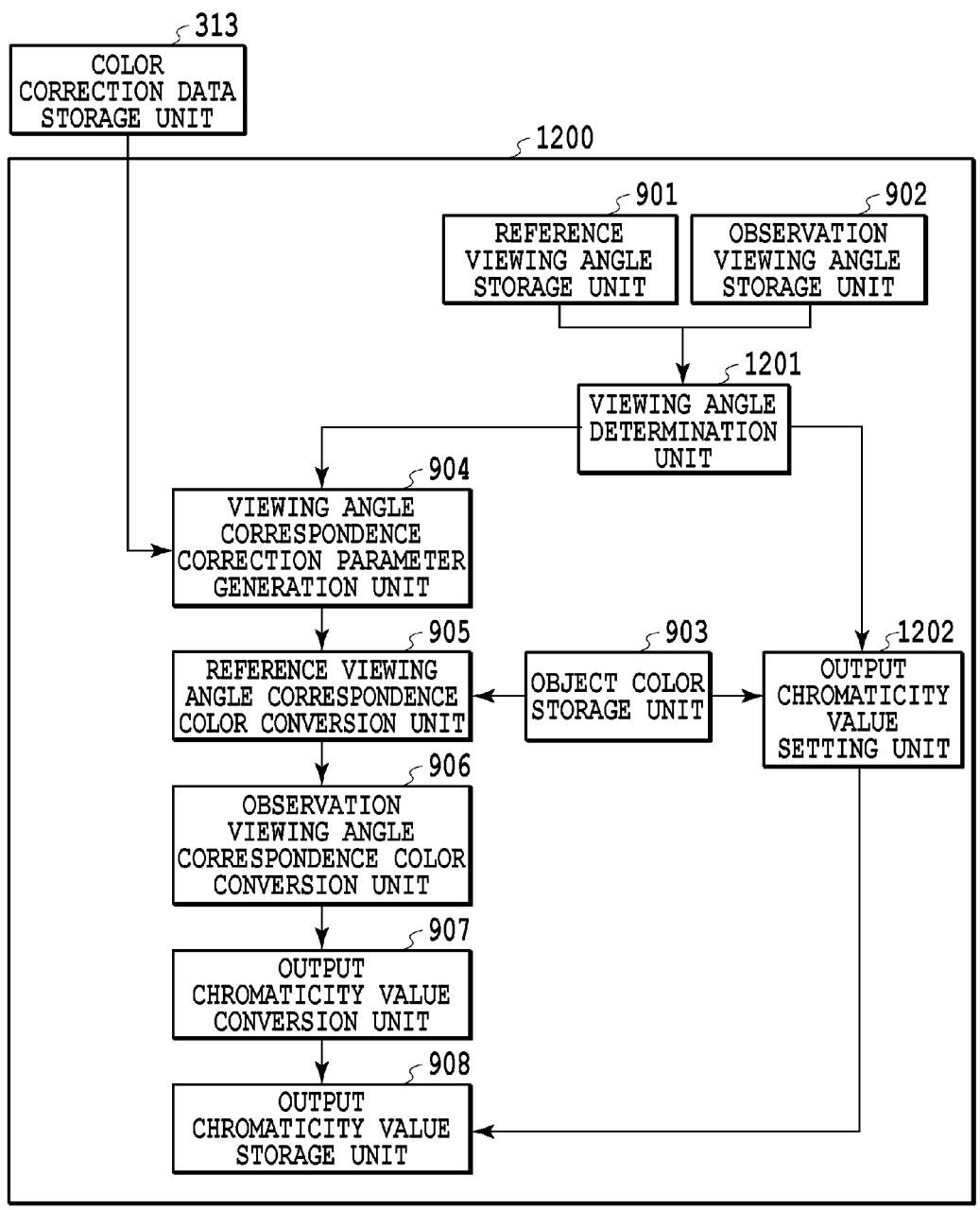
FIG. 12 is a block diagram illustrating a color correction unit in an image processing apparatus according to Embodiment 2.

FIG. 12 is a block diagram illustrating a color correction unit 1200 in an image processing apparatus according to this embodiment. With reference to FIG. 12, a block configuration of the color correction unit 1200 is described. Note that the same configuration as that shown in FIG. 9 is described using the same reference numerals.

The color correction unit 1200 in the image processing apparatus according to this embodiment includes a viewing angle determination unit 1201 and an output chromaticity value setting unit 1202, in addition to the configuration of the color correction unit 314 in Embodiment 1.

The viewing angle determination unit 1201 compares the reference viewing angle 104 with the observation viewing angle 113 to determine whether or not the viewing angles coincide with each other. If the viewing angles coincide with each other, the inputted saturation and brightness coincide with the saturation and brightness after conversion in the conversion using the color correction parameters of the saturation and brightness in the color correction processing in Embodiment 1. Therefore, it is not required to perform saturation and brightness conversion using the correction parameters corresponding to the viewing angle.

In a case where it is determined by the viewing angle determination unit 1201 that the viewing angles coincide with each other, the output chromaticity value setting unit 1202 sets the inputted colorimetric value of the object as an output chromaticity value, and stores the output chromaticity value in the output chromaticity value storage unit 908.

Figure 13:
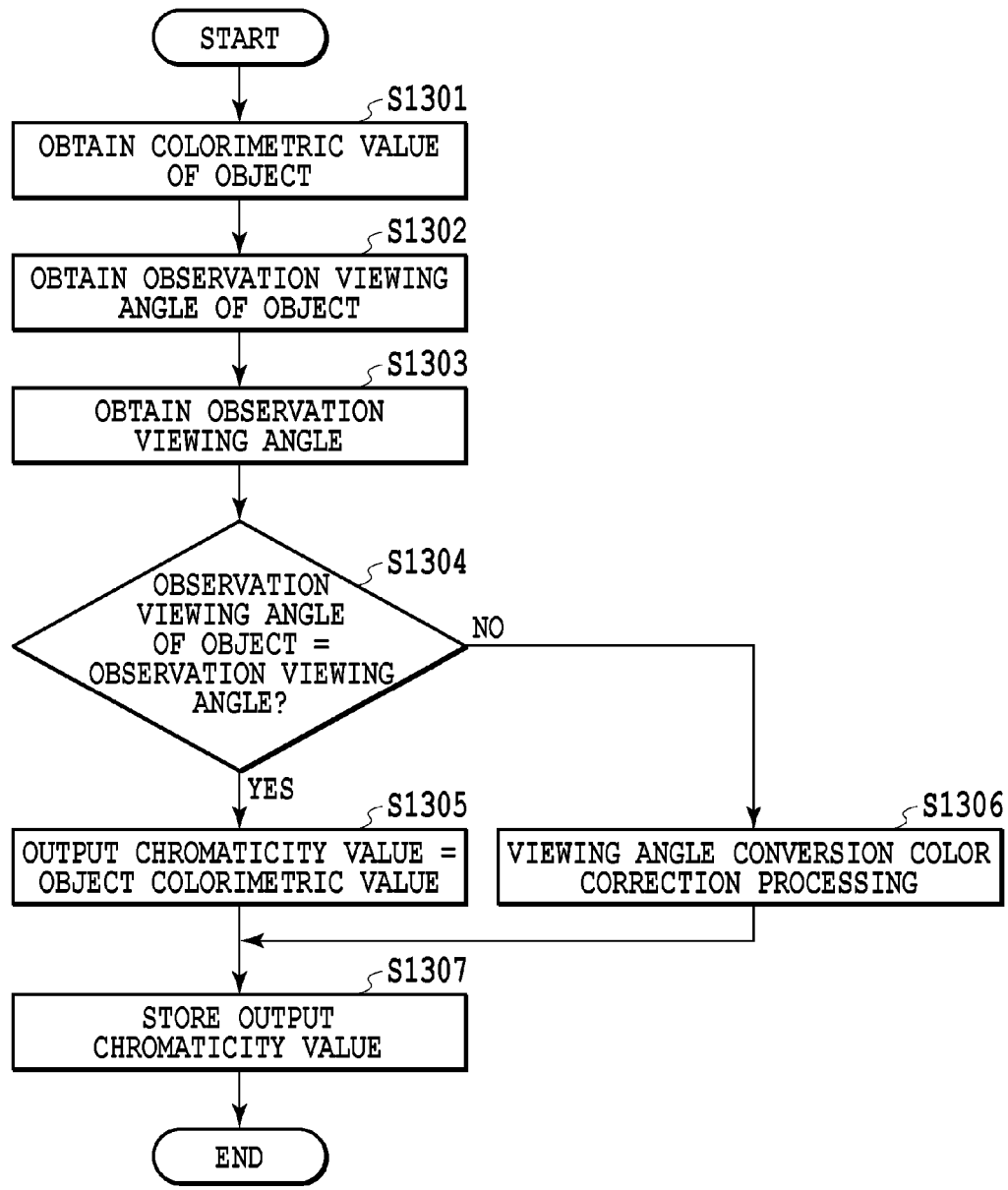
FIG. 13 is a flowchart illustrating color correction processing in the image processing apparatus according to Embodiment 2.

FIG. 13 is a flowchart illustrating color correction processing in the image processing apparatus according to this embodiment. With reference to FIG. 13, description is given of a color correction processing flow depending on the viewing angle in the image processing apparatus according to this embodiment.

In Step S1301, the object color storage unit 903 obtains and stores the colorimetric value of the object 102 as an input value. In Step S1302, the reference viewing angle storage unit 901 obtains and stores the reference viewing angle 104 of the object 102. In Step S1303, the observation viewing angle storage unit 902 obtains and stores the observation viewing angle 113 of the object region on the output image, based on the output size 109 of the object region and the observation distance 111 of the output image.

In Step S1304, the viewing angle determination unit 1201 compares the reference viewing angle 104 with the observation viewing angle 113 to determine whether or not the viewing angles coincide with each other. If the viewing angles coincide with each other in Step S1304, the processing advances to Step S1305. On the other hand, if the viewing angles do not coincide with each other, the processing advances to Step S1306.

In Step S1305, the output chromaticity value setting unit 1202 sets the inputted colorimetric value of the object 102 as an output chromaticity value. In Step S1306, the output chromaticity value conversion unit 907 converts the colorimetric value of the object 102 by the color correction processing depending on the viewing angle in Steps S1104 to S1113 shown in FIG. 11, thereby obtaining the output chromaticity value. In Step S1307, the output chromaticity value storage unit 908 stores the output chromaticity value set in Step S1305 or the output chromaticity value obtained in Step S1306.

As described above, according to this embodiment, the color correction processing can be simplified.

Embodiment 3

In Embodiment 3, description is given of processing different from those in Embodiments 1 and 2. Embodiment 3 relates to a mode, in color matching between a first device and a second device, of adjusting the size of a color gamut of each of the devices displaying a first observation target and a second observation target, respectively, depending on a difference in viewing angle between the devices. Here, the color gamut means a reproduction range of colors that can be displayed by a display device, i.e., a color reproduction characteristic. To be more specific, in this embodiment, assuming that the output device 208 is a printer 208, a color gamut between the printer 208 and the monitor 206 is adjusted depending on a difference in viewing angle between observation targets to be outputted by these devices. More specifically, Embodiment 3 relates to color matching processing to reproduce the color hue on the monitor 206 with the printer 208.

Figure 14:
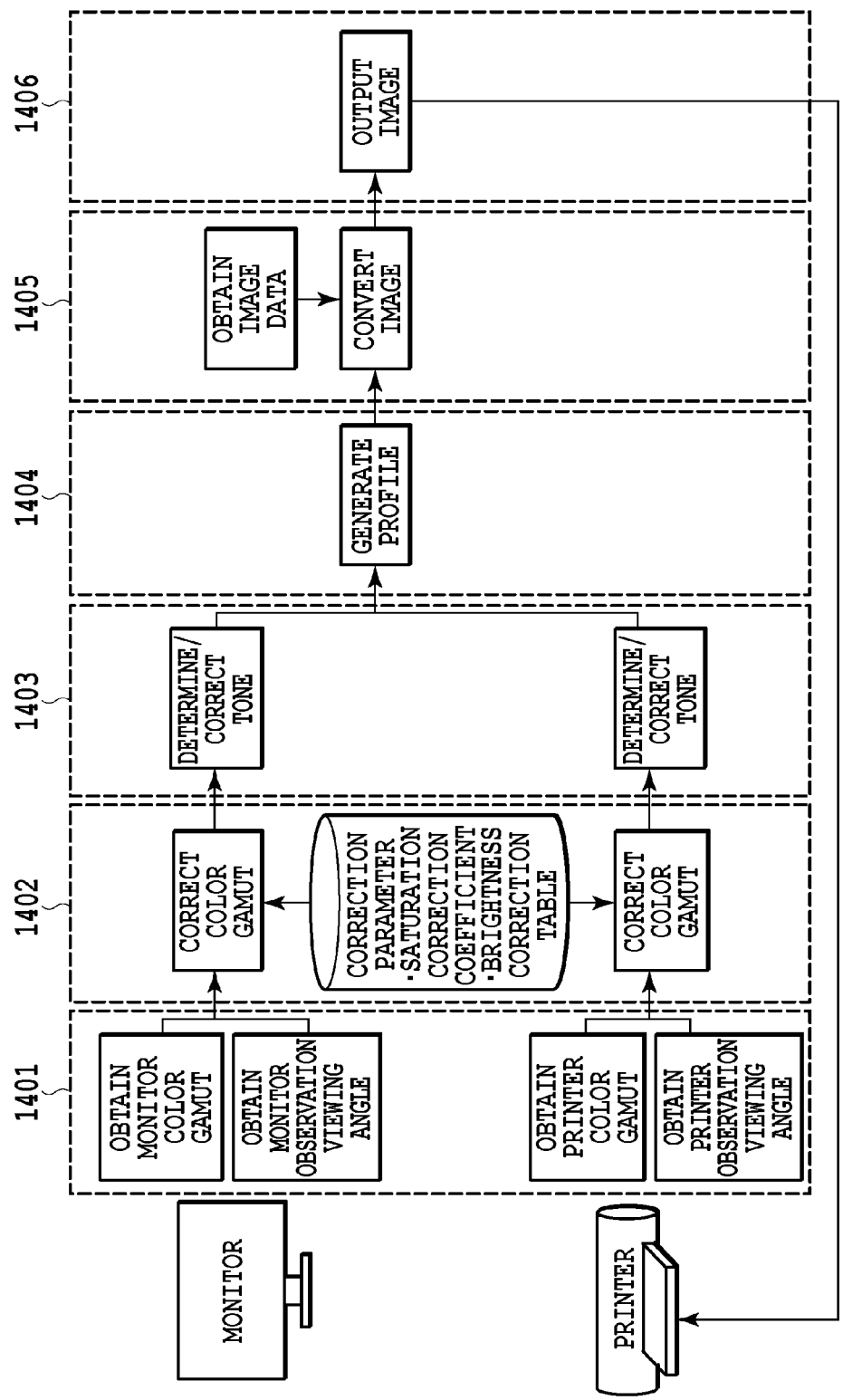
FIG. 14 is a conceptual diagram for illustrating a processing overview of an arithmetic processing unit according to Embodiment 3.

FIG. 14 is a conceptual diagram for illustrating an overview of processing by an arithmetic processing unit in this embodiment. With reference to FIG. 14, description is given of the overview of the processing performed by the arithmetic processing unit in this embodiment. The arithmetic processing is performed in the order of Steps 1401 to 1406 shown in FIG. 14.

First, in Step 1401, a color gamut that is a color reproduction characteristic and an observation viewing angle 113 are obtained for each of the devices, the monitor 206 and the printer 208. In Step 1402, the obtained color gamut of each device is corrected. This correction processing is performed based on correction parameters corresponding to the observation viewing angle 113. The color gamut corrected by the processing is treated as a color gamut corresponding to the color hue actually perceived by humans, taking an area effect into consideration. In Step 1403, tone determination and tone correction of the corrected color gamut, since the tone may be deteriorated by the color gamut correction processing.

In Step 1404, a profile is generated. In this embodiment, a color conversion table for reproducing the color hue on the monitor 206 with the printer 208 is called the profile. In other words, Step 1404 is to generate the color conversion table. In Step 1405, image data to be outputted is obtained, and the image data is converted based on the profile. In the last Step 1406, the converted image data is used to output an image with the printer.

Figure 15A:
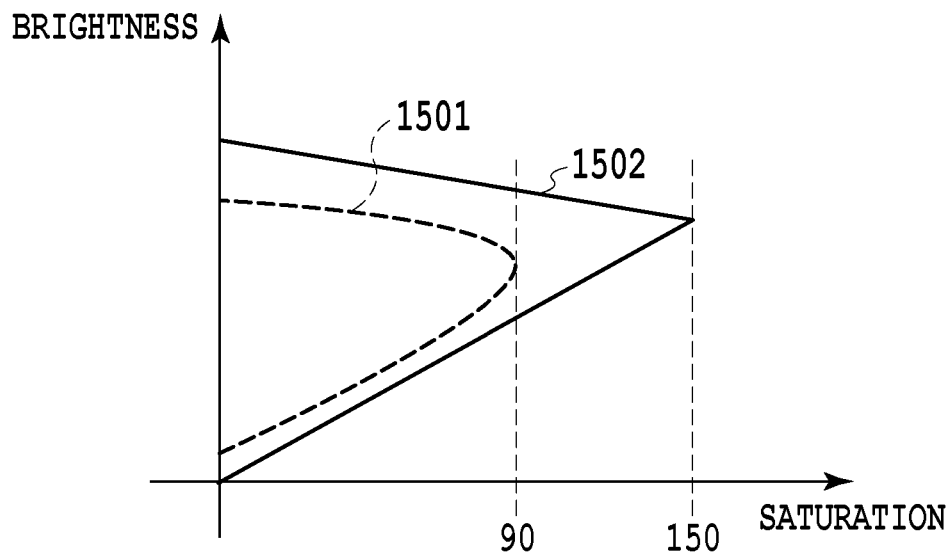
FIGS. 15A and 15B are conceptual diagrams for illustrating the purpose of correction attributable to an area effect according to Embodiment 3.
Figure 15B:
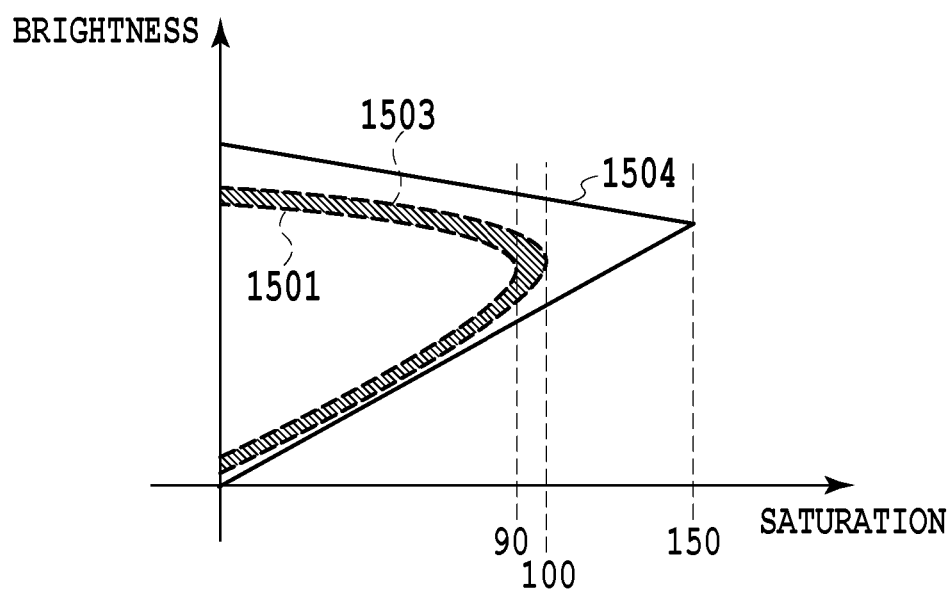

FIGS. 15A and 15B are conceptual diagrams for illustrating the purpose of performing correction attributable to an area effect according to this embodiment. With reference to FIGS. 15A and 15B, description is given of an effect achieved by the matching processing on the corrected color gamut. FIG. 15A shows a printer color gamut 1501 and a monitor color gamut 1502 before color gamut correction. In this event, each color gamut represents a color gamut at a predetermined viewing angle (i.e., a measurement viewing angle) defined by CIE. Here, the measurement viewing angle is 2 degrees. As shown in FIG. 15A, as to the color gamut at the measurement viewing angle, the monitor color gamut 1502 is larger than the printer color gamut 1501. Meanwhile, FIG. 15B shows a printer color gamut 1503 and a monitor color gamut 1504 after the color gamut correction. FIG. 15B shows an example where an observation viewing angle of the printer is larger than the measurement viewing angle, while an observation viewing angle of the monitor is the same as the measurement viewing angle. In this case, according to the observation viewing angle of the printer, the printer color gamut 1503 after the correction is larger than the printer color gamut 1501 before the correction. As a result, since the profile is generated using the expanded printer color gamut 1503 after the correction, colors to be perceived can be approximated between the different devices. As described above, the profile is generated on the color gamut after the correction while taking the area effect into consideration. Thus, the color matching processing between the devices, which is capable of correcting the color hue attributable to the area effect, can be realized.

Figure 16:
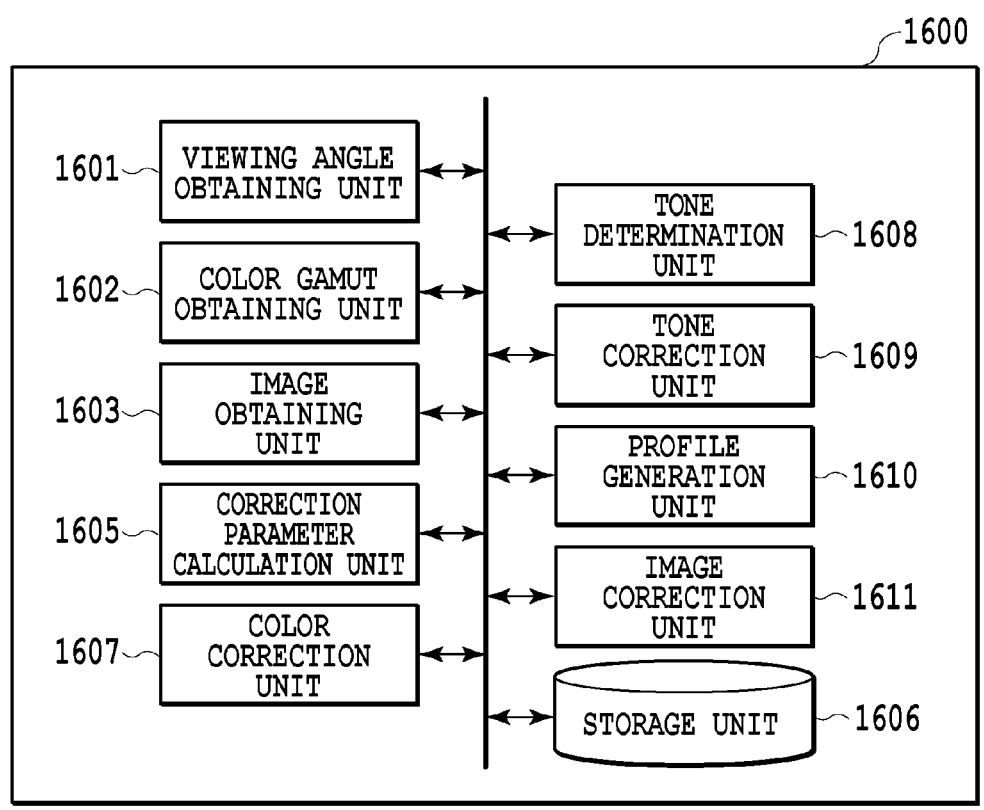
FIG. 16 is a block diagram illustrating a logical configuration of the arithmetic processing unit in Embodiment 3.

FIG. 16 is a block diagram illustrating a logical configuration of functions of an arithmetic processing unit 1600 according to this embodiment, which corresponds to the arithmetic processing unit 205 shown in FIG. 2 according to Embodiment 1. With reference to FIG. 16, description is given of the logical configuration of the arithmetic processing unit 1600 according to this embodiment.

The arithmetic processing unit 1600 includes a viewing angle obtaining unit 1601, a color gamut obtaining unit 1602, an image obtaining unit 1603, a correction parameter calculation unit 1605, a storage unit 1606, a color correction unit 1607, a tone determination unit 1608, a tone correction unit 1609, a profile generation unit 1610 and an image correction unit 1611.

The viewing angle obtaining unit 1601 obtains an observation viewing angle for observing output images from the monitor 206 and the printer 208. The color gamut obtaining unit 1602 obtains a monitor color gamut and a printer color gamut at a predetermined viewing angle. Here, the predetermined viewing angle is a 2-degree viewing angle specified by CIE. As in the case of Embodiment 1, the 2-degree viewing angle is called the measurement viewing angle. The image obtaining unit 1603 obtains output image data from the monitor 206 and the printer 208. As to the observation viewing angle, the color gamut and the output image data obtained by the viewing angle obtaining unit 1601, the color gamut obtaining unit 1602 and the image obtaining unit 1603, respectively, input thereof is instructed by the operation unit 204. However, the color gamut can also be obtained directly from the connected input device 207 such as the colorimeter 107.

The correction parameter calculation unit 1605 reads correction parameters from the storage unit 1606 corresponding to the observation viewing angle obtained by the viewing angle obtaining unit 1601. In a case where there is no correction parameter corresponding to the observation viewing angle, the correction parameter corresponding to the observation viewing angle is calculated by interpolation of correction parameters for another viewing angle, or the like. The correction parameters are used for color gamut correction.

The color correction unit 1607 corrects the color gamut obtained by the color gamut obtaining unit 1602 based on the correction parameters obtained by the correction parameter calculation unit 1605. Here, the color gamut correction means compression or extension processing of brightness and saturation so as to respond to a change in hue of brightness and saturation at each observation viewing angle. The color gamut after the correction is different from a color gamut obtained by color measurement using a spectral radiance meter or the like.

The tone determination unit 1608 performs tone determination of the color gamut corrected by the color correction unit 1607. The tone correction unit 1609 performs tone correction based on the result of the determination by the tone determination unit 1608. The profile generation unit 1610 generates a profile based on the corrected color gamut.

The image correction unit 1611 uses the profile generated by the profile generation unit 1610 to convert the colors of the output images from the monitor 206 and the printer 208, which are obtained by the image obtaining unit 1603.

Figure 17:
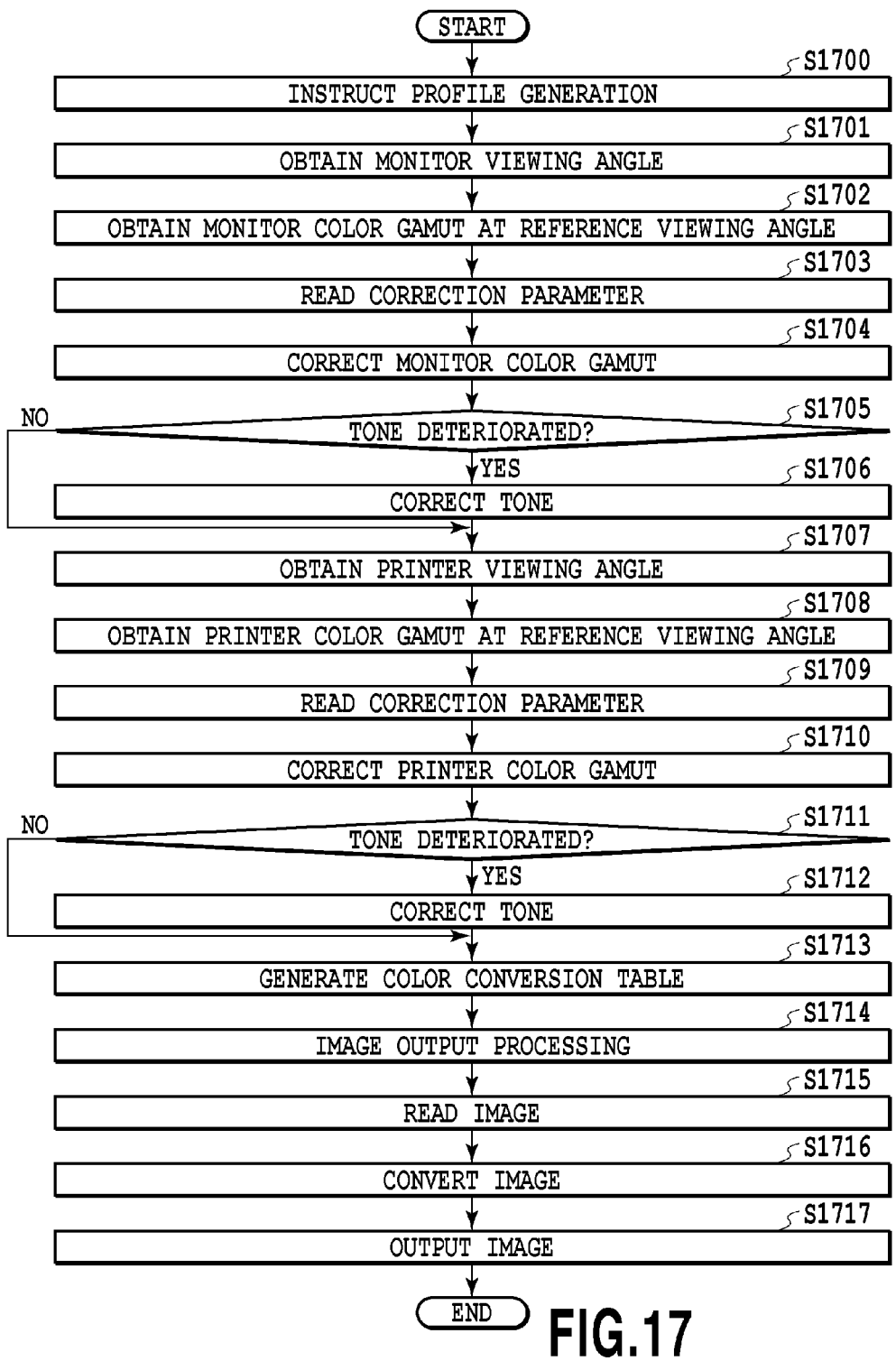
FIG. 17 is a flowchart illustrating image processing in the image processing apparatus according to Embodiment 3.

FIG. 17 is a flowchart illustrating image processing in the image processing apparatus according to this embodiment. With reference to FIGS. 17 to 22, detailed description is given of processing executed by the arithmetic processing unit 1600 according to this embodiment.

Figure 18:
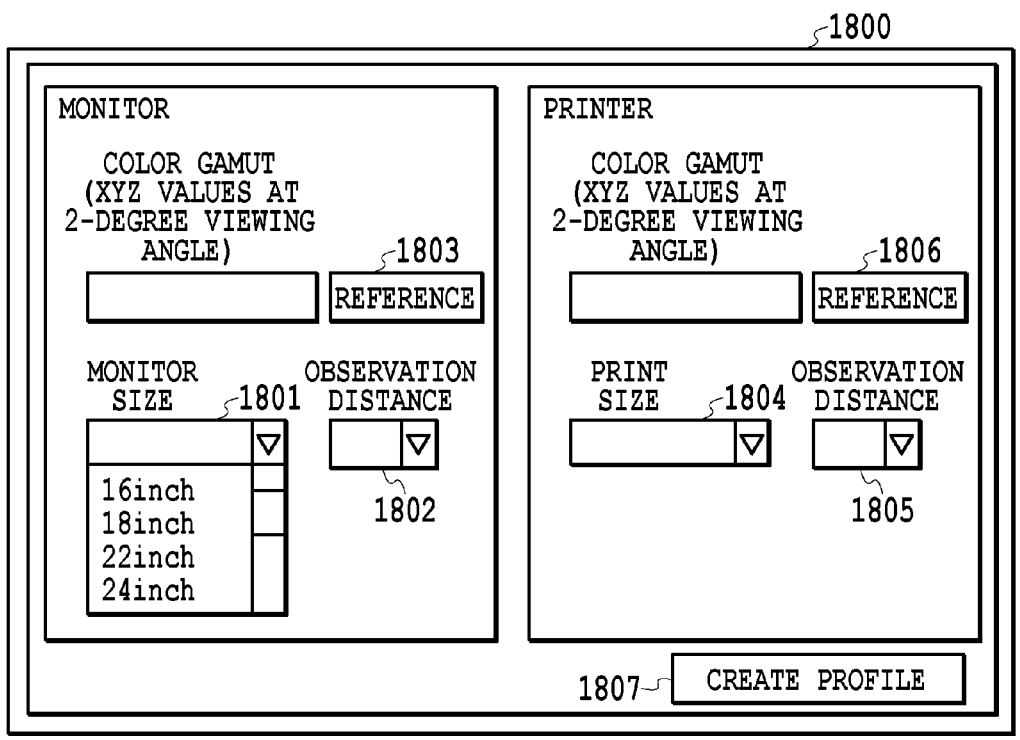
FIG. 18 is a diagram illustrating an example of a UI in Embodiment 3.

In Step S1700, a user presses a profile generation button 1807 on a UI 1800 shown in FIG. 18 after inputting a storage location of color gamut data, a monitor size, a print size and an observation distance for each device through the operation unit 204. The following processing in Steps S1701 to S1713 is automatically executed after the profile generation button 1807 is pressed.

In Step S1701, the viewing angle obtaining unit 1601 obtains an observation viewing angle in observation of the monitor 206, based on the information inputted through the operation unit 204. The observation viewing angle is calculated based on the information instructed by the user on the UI 1800 shown in FIG. 18.

FIG. 18 is a diagram illustrating the UI 1800 displayed on the monitor 206 to carry out color correction processing depending on the observation viewing angle in a case of outputting an output image by the printer. On the UI 1800, a monitor size input button 1801, an observation distance input button 1802 for the monitor 206, a reference button 1803, a print size input button 1804, an observation distance input button 1805 for the printer, a reference button 1806 and the profile generation button 1807 are displayed.

To be more specific, in order to calculate the observation viewing angle of the monitor, a monitor size is specified from options displayed by pressing the monitor size input button 1801 on the UI 1800. Also, an observation distance is specified from options displayed by pressing the observation distance input button 1802. Then, as in the case of Embodiment 1, an angle θ of the observation viewing angle is calculated using Expression 1 based on the specified monitor size W and observation distance D. In this embodiment, assuming that an image is to be displayed in the entire area on the monitor 206, the monitor size and the image data are regarded as the same. However, in a case where the monitor size is different from a display size, an image size corresponding to the display size may be obtained. Moreover, although it is assumed in this embodiment that W denotes the diagonal length of the monitor 206, W may denote the vertical or horizontal length thereof.

In Step S1702, the color gamut obtaining unit 1602 obtains a monitor color gamut at the predetermined measurement viewing angle. As in the case of Step S1701, the monitor color gamut is obtained based on the information instructed by the user on the UI 1800 shown in FIG. 18. To be more specific, the monitor reference button 1803 on the UI 1800 is pressed to specify a data file holding the monitor color gamut, and then the color gamut is read and obtained from the specified data file.

FIG. 19 is a diagram illustrating a device color gamut data format to be obtained in this embodiment. With reference to FIG. 19, monitor color gamut data is described. The monitor color gamut data means Lch that is a CIE color space in 729 colors (nine RGB slices) at the 2-degree viewing angle that is the measurement viewing angle. The monitor color gamut data is pre-stored in the storage unit 1606 as a correspondence table between RGB and Lch values as shown in FIG. 19.

In Step S1703, the correction parameter calculation unit 1605 reads correction parameters corresponding to the observation viewing angle obtained in Step S1701 from the storage unit 1606. The correction parameters mean brightness correction parameters and saturation correction parameters corresponding to the observation viewing angle as shown in FIG. 14, such as those described in Embodiment 1.

In Step S1704, the color correction unit 1607 corrects the monitor color gamut obtained in Step S1702, based on the correction parameters obtained in Step S1703. To be more specific, the color correction unit 1607 corrects the monitor color gamut so as to realize the brightness and saturation depending on the observation viewing angle obtained in Step S1701 by referring to the saturation correction coefficient and brightness correction table included in the correction parameters.

FIGS. 20A to 20C are conceptual diagrams for illustrating a change in color gamut according to the correction parameters in this embodiment. With reference to FIGS. 20A to 20C, description is given of a change in color gamut according to the correction parameters in this embodiment. FIG. 20A shows a relationship of brightness between before and after color conversion. FIG. 20B shows a relationship of saturation between before and after color conversion. FIG. 20C shows a cross-section of a color gamut on a plane of brightness and saturation (LC plane).

In FIG. 20A, the horizontal and vertical axes represent brightness at a 2-degree viewing angle (measurement viewing angle). Solid line 2001 indicates a relationship between input brightness and brightness perceived by the observer 112 at a viewing angle larger than the 2-degree viewing angle. Broken line 2002 indicates brightness at the 2-degree viewing angle. Likewise, in FIG. 20B, the horizontal and vertical axes represent saturation at the 2-degree viewing angle. Solid line 2003 indicates a relationship between input saturation and saturation perceived by the observer 112 at a viewing angle larger than the 2-degree viewing angle. Broken line 2004 indicates saturation at the 2-degree viewing angle. Meanwhile, a color gamut indicated by broken line 2005 in FIG. 20C represents a color gamut before correction, while a color gamut indicated by solid line 2006 represents a color gamut after correction. In a case where the observation viewing angle 113 is larger than the measurement viewing angle, the saturation and brightness are increased, resulting in expansion of the color gamut that is a perceivable color reproduction characteristic of each device.

In Step S1705, the tone determination unit 1608 performs tone determination of whether or not tone deterioration occurs in the color gamut corrected in Step S1704. The tone determination is performed by referring to a gray line from black to white, for example. More specifically, it is determined whether or not the following (Expression 3) is true for each L value of colors in a total of nine steps by increasing each of RGB values shown in FIG. 19 by 32 from 0 (by 31 from the last 224).

$$L(i) > L(i+1) \quad \text{(Expression 3)}$$

Here, L (i) represents the L value of the color in Step i. For example, L (i) represents the L value corresponding to the RGB value (0, 0, 0) if i=0, and represents the L value corresponding to the RGB value (32, 32, 32) if i=1. A region where Expression 3 is not true turns out to be a region where tone deterioration has occurred. Here, if there is even one region with tone deterioration, it is determined that there is tone deterioration. If it is determined that there is tone deterioration, the processing moves to Step S1706. On the other hand, if it is determined that there is no tone deterioration, the processing moves to Step S1707.

In Step S1706, the tone correction unit 1609 performs tone correction by performing brightness correction processing on the color gamut corrected in Step S1704. To be more specific, a range where a predetermined buffer is provided in a region with tone deterioration is set as a correction range, and a starting point and an end point of the correction range are interpolated with a spline curve or the like. Thus, the correction processing for the monitor color gamut is performed.

Next, description is given of correction processing for the printer color gamut. In Step S1707, the viewing angle obtaining unit 1601 obtains an observation viewing angle in observation of the printer 208, based on the information inputted through the operation unit 204. The user also specifies a printer size from options displayed by pressing the print size input button 1804 on the UI 1800. Then, the user specifies an observation distance from options displayed by pressing the observation distance input button 1805 for the printer 208. Thereafter, as in the case of Step S1701, the viewing angle obtaining unit 1601 calculates an angle θ of the observation viewing angle by using Expression 1 based on the specified printer size W and observation distance D.

In Step S1708, the color gamut obtaining unit 1602 obtains a printer color gamut at the predetermined measurement viewing angle. To be more specific, the user presses the printer reference button 1806 on the UI 1800 to specify a data file holding the printer color gamut, and then reads printer color gamut data from the specified data file. Here, as in the case of Step S1702, the printer color gamut data means Lch that is a CIE color space in 729 colors (nine RGB slices) at the 2-degree viewing angle.

In Step S1709, the correction parameter calculation unit 1605 reads correction parameters corresponding to the observation viewing angle obtained in Step S1707 from the storage unit 1606, as in the case of Step S1703. Then, in Step S1710, the color correction unit 1607 corrects the printer color gamut obtained in Step S1708, based on the correction parameters obtained in Step S1709, as in the case of Step S1704.

In Step S1711, the tone determination unit 1608 performs tone determination of whether or not tone deterioration occurs in the color gamut corrected in Step S1710, as in the case of Step S1705. If it is determined that there is tone deterioration, the processing moves to Step S1712. On the other hand, if it is determined that there is no tone deterioration, the processing moves to Step S1713. In Step S1712, the tone correction unit 1609 performs tone correction by performing brightness correction processing on the color gamut corrected in Step S1710, as in the case of Step S1706. Thus, the correction processing for the printer color gamut is performed.

Next, description is given of color conversion processing corresponding to the corrected monitor color gamut and printer color gamut. In Step S1713, the profile generation unit 1610 generates a profile. More specifically, the profile generation unit 1610 generates a color conversion table. The profile is generated based on the monitor color gamut corrected in Step S1704 or Step S1706 and the printer color gamut corrected in Step S1710 or Step S1712.

FIG. 21 is a diagram illustrating a data format of the profile according to this embodiment. With reference to FIG. 21, the profile is described. The profile in this embodiment means a correspondence table (RGB-RGBLUT) of an RGB value (Rp, Gp, Bp) for reproducing, by the printer, the color hue of a certain RGB value (Rm, Gm, Bm) displayed on the monitor 206. For example, the profile is generated by associating an RGB value in a case of displaying a first value in the corrected monitor color gamut and printer color gamut on the monitor 206 with an RGB value in a case of outputting the first value by the printer.

In Step S1714, the user instructs output of image data through the operation unit 204. The following processing from Step S1715 to Step S1717 is automatically executed as the output of the image data is instructed by the user. In Step S1715, the image obtaining unit 1603 obtains image data to be outputted, based on information inputted through the operation unit 204.

In Step S1716, the image correction unit 1611 converts the color of the image data obtained in Step S1715, based on the profile generated in Step S1713. In Step S1717, the CPU 201 controls the output device (printer) 208 to output the output image having the color converted in Step S1716. As to the output image to be outputted by the printer as described above, in a case of observing the output image at a position corresponding to the specified viewing angle, the output image includes colors having a color gamut extended so that the colors are perceived as the same colors as those on the monitor.

In this embodiment, the monitor size, the print size and the observation distance 111 are inputted upon instruction of the user on the UI 1800 in the profile generation application shown in FIG. 18, and the observation viewing angle 113 is obtained based on such information. However, such information may be inputted upon instruction on a screen of a UI 2200 in a printer driver configured to perform output setting shown in FIG. 22.

Figure 22:
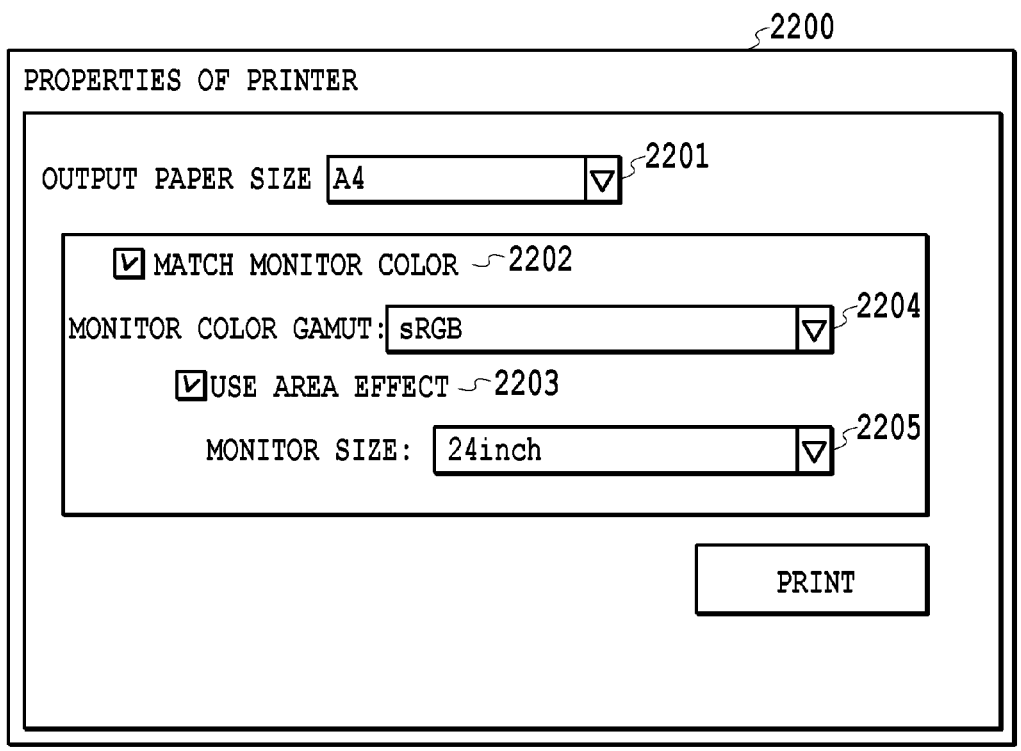
FIG. 22 is a diagram illustrating an example of a UI in Embodiment 3.

FIG. 22 is a diagram illustrating the UI 2200 for displaying properties of the printer on the monitor 206 in this embodiment. On the UI 2200, an output paper size input button 2201, a color specification check box 2202, an area effect check box 2203, a monitor color gamut specification button 2204 and a monitor size specification button 2205 are displayed. As a specific input method, first, an output paper size is specified with the output paper size input button 2201 on the UI 2200 in the printer driver to perform the output setting shown in FIG. 22. Next, the color specification check box 2202 is checked, and the monitor color gamut is specified with the monitor color gamut specification button 2204. In a case of further performing matching processing for an area effect, the area effect check box 2203 is checked, and the monitor size is specified with the monitor size specification button 2205.

As described above, in this embodiment, the color gamut shape is corrected so as to realize actually perceivable brightness and saturation depending on observation conditions. Thus, the color matching processing can be performed using the corrected color gamut. Accordingly, by performing the matching processing on the color gamut corrected depending on the size, colors to be perceived coincide also in a case where the size in which the observation target is observed varies. As a result, the color matching processing can be realized between the devices having the corrected color hue attributable to the area effect.

Moreover, a change in brightness and saturation is expansion or reduction of the color gamut. Therefore, the tone within a region expanded by an area effect, for example, is recognized as an unreproducible color unless the color gamut is corrected beforehand. As a result, the tone may be impaired once. In this embodiment, by determining and correcting tone deterioration due to the consideration of the area effect, the tone deterioration can be suppressed and accurate color reproduction can be performed.

Embodiment 4

In Embodiment 3, the description is given of the example where the user instructs input of the monitor size, the print size and the observation distance on the UI 1800 in the profile generation application shown in FIG. 18, and the observation viewing angle is obtained based on such information.

In Embodiment 4, description is given of an embodiment in which the projector 114 is used as the output device 208 and the information is automatically obtained using a sensor included in the projector 114. Note that, since Embodiment 4 is the same as Embodiment 3 except for the viewing angle obtaining processing described in Embodiment 3, description thereof is omitted.

Figure 23:
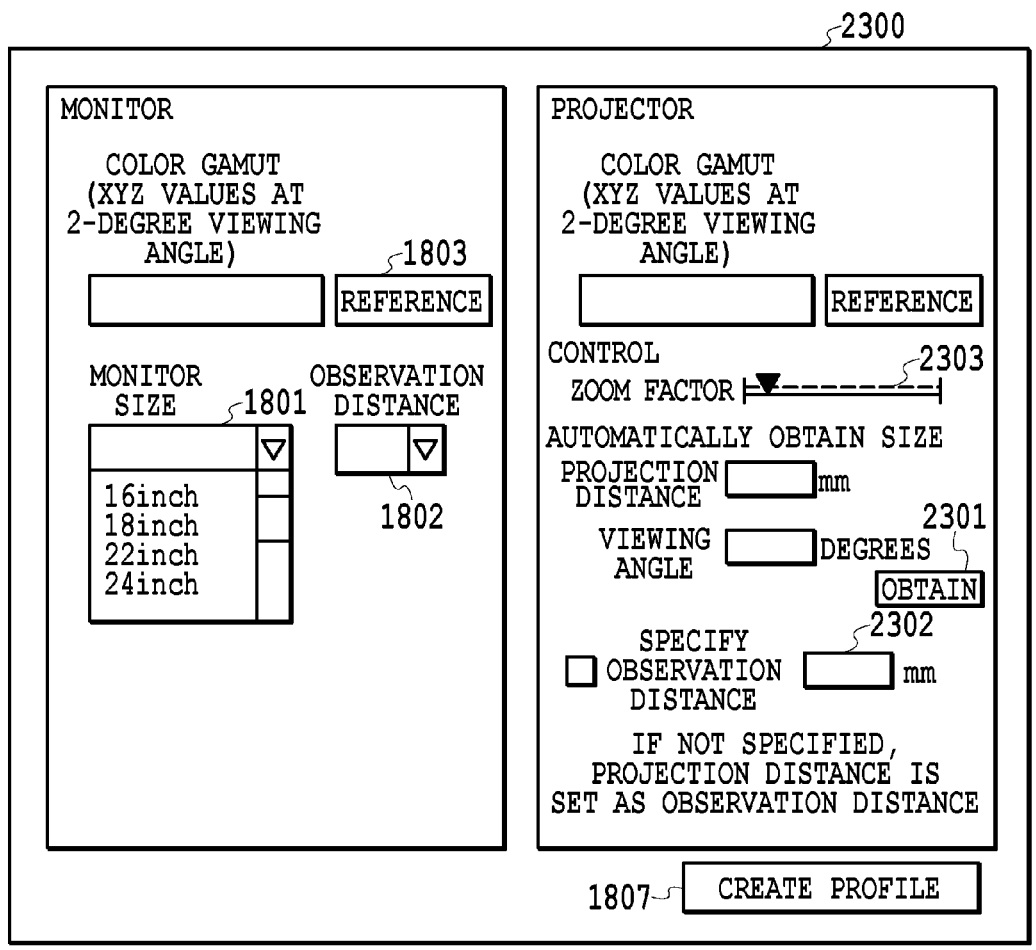
FIG. 23 is a diagram illustrating an example of a UI in Embodiment 4.

This embodiment is different from Embodiment 3 in using the projector including a sensor capable of detecting a projection distance as the output device 208, and also in using an application UI 2300 for generating a profile of the projector shown in FIG. 23 instead of the UI 1800 shown in FIG. 18.

FIG. 23 is a diagram illustrating the UI 2300 to be displayed to the user for carrying out color correction processing depending on the observation viewing angle in a case of using the projector as the output device 208. As in the case of the UI 1800 shown in FIG. 18, a monitor size input button 1801, an observation distance input button 1802 for the monitor 206 and a reference button 1803 are displayed on the UI 2300. On the UI 2300, an automatic size obtaining button 2401, an observation distance specification button 2302 and a zoom factor specification gauge 2303 for the projector are also displayed. By the user adjusting the zoom factor specification gauge 2303 through the operation unit 204, display magnification can be obtained and controlled in conjunction with the projector 114. By also pressing the automatic size obtaining button 2401, a projection distance from the built-in sensor and the observation viewing angle can be automatically obtained. Note that the observation viewing angle is calculated using a projection distance between the projector 114 and the screen as the observation distance. Thus, in a case where the observation distance varies, the observation distance can be directly inputted using the observation distance input button 1802 on the monitor 206 as in the case of Embodiment 3.

As described above, in this embodiment, the color matching processing can be performed between the devices having the corrected color hue attributable to the area effect by correcting each color gamut depending on the viewing angle of the monitor and the viewing angle of the projector.

Embodiment 5

In Embodiment 3, the description is given of the method for realizing accurate color matching in consideration of the area effect by correcting the color gamut. In Embodiment 5, description is given of a method for performing color matching by switching whether or not to apply color gamut correction processing based on the color gamut between devices before and after correction.

First, description is given of the purpose of switching whether or not to apply color gamut correction due to an area effect. As described in Embodiment 3, in order to respond to the color hue in consideration of the area effect, it is required to generate a profile corresponding to the color gamut previously subjected to correction processing depending on the observation viewing angle. However, in a case where a gap of the color gamut between the devices is increased by the correction processing, the region with lost tone is increased. Such a situation is described with reference to FIGS. 15A and 15B. In Embodiment 3, the description is given of the example where the printer color gamut 1503 after the correction becomes larger than the printer color gamut 1501 before the correction. The description is also given of the example where there is no change in the monitor color gamut 1504. Contrary to the example shown in FIG. 15B, there is a case where the printer color gamut after the correction becomes smaller than the printer color gamut before the correction, a case where the monitor color gamut after the correction is increased, and a case where a gap of the color gamut between the devices becomes larger than each color gamut before the correction as shown in FIG. 15A. More specifically, in a case where a ratio of the monitor color gamut covered by the printer color gamut (color gamut coverage) is reduced, a region to be compressed (the monitor color gamut that cannot be covered by the printer color gamut) is increased. As a result, the region with lost tone is increased. In order to realize accurate matching between devices, it is required to compress a region that cannot be reproduced. However, in a case of emphasizing the tone over accurate reproduction, the tone can be further maintained by switching whether or not to perform color gamut correction based on the coverage of the color gamut after correction.

Figure 24:
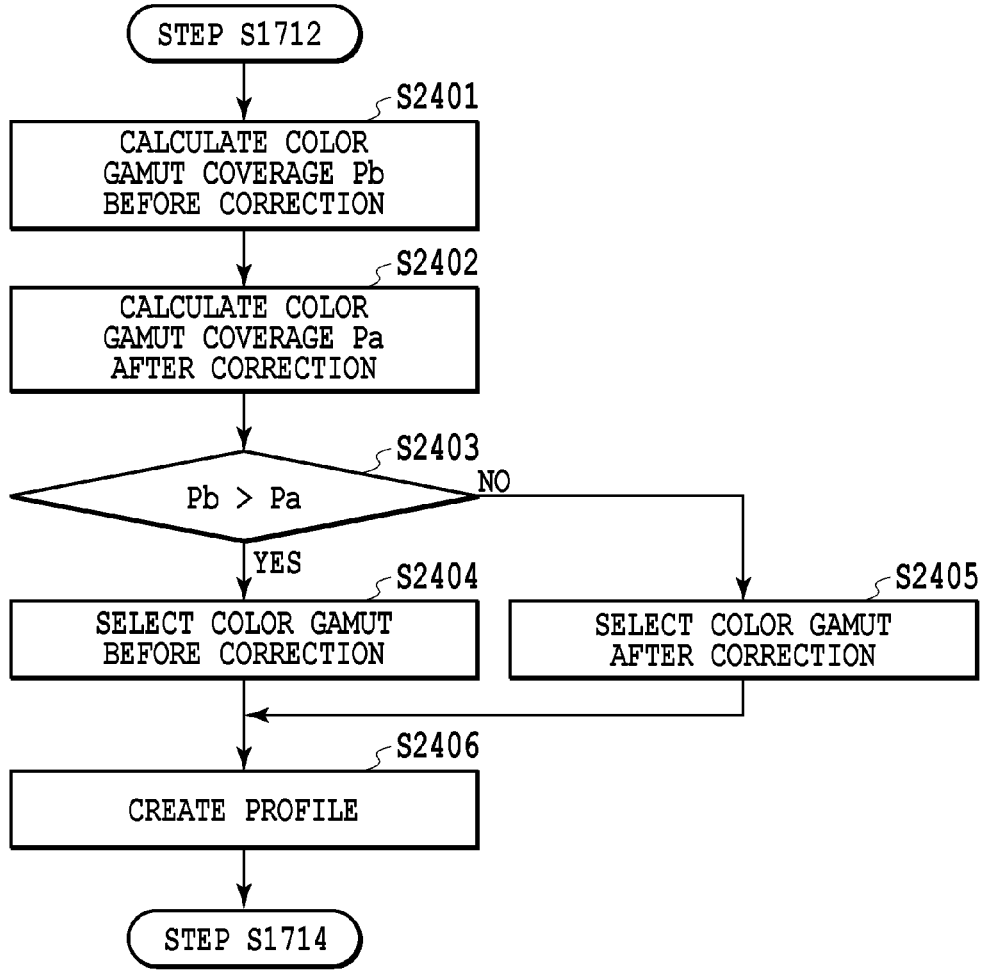
FIG. 24 is a flowchart illustrating color gamut correction processing in an image processing apparatus according to Embodiment 5.

FIG. 24 is a flowchart illustrating color gamut correction processing in the image processing apparatus according to this embodiment. With reference to FIG. 24, description is given of a color gamut correction processing flow in this embodiment. Note that, in the color gamut correction processing in this embodiment, the profile generation processing in Step S1713 in Embodiment 3 is replaced with Steps S2401 to S2406 shown in FIG. 24. Since the other processing is the same as that in Embodiment 3, description thereof is omitted. Moreover, the processing is performed by the profile generation unit 1610 in the arithmetic processing unit 1600.

In Step S2401, the profile generation unit 1610 calculates a color gamut coverage Pb by obtaining a printer color gamut and a monitor color gamut before correction processing. Here, the color gamut coverage means a color gamut of a second device, which is covered by a color gamut of a first device. In this embodiment, the color gamut coverage means a volume percent of the monitor color gamut covered by the printer color gamut.

In Step S2402, the profile generation unit 1610 calculates a color gamut coverage Pa, as in the case of Step S2401, by obtaining the printer color gamut and the monitor color gamut subjected to the correction processing based on the area effect.

In Step S2403, the profile generation unit 1610 compares the color gamut coverage Pb calculated in Step S2401 with the color gamut coverage Pa calculated in Step S2402. If the color gamut coverage Pb before correction>the color gamut coverage Pa after correction, the processing moves to Step S2404. If not, the processing moves to Step S2405.

In a case where the color gamut coverage before correction is larger than the color gamut coverage after correction, the use of the color gamut after correction increases the region with lost tone. Therefore, in Step S2404, the profile generation unit 1610 selects the printer color gamut and the monitor color gamut before the correction processing as the color gamut to be used for profile generation. On the other hand, in Step S2405, the profile generation unit 1610 selects the printer color gamut and the monitor color gamut after the correction processing as the color gamut to be used for profile generation.

In Step S2406, the profile generation unit 1610 generates a profile by using the color gamut selected in Step S2504 or Step S2405. By the processing from Step S2401 to Step S2406 described above, the matching processing between the devices is performed, which prioritizes the tone. Here, the user can specify on a UI shown in FIG. 25 whether to adopt a mode of performing accurate matching processing in consideration of the area effect by carrying out the processing described in Embodiment 3 or a mode of performing the matching processing that prioritizes the tone depending on the coverage described in this embodiment. In other words, a configuration can be employed, which enables the user to decide which mode to adopt.

Figure 25:
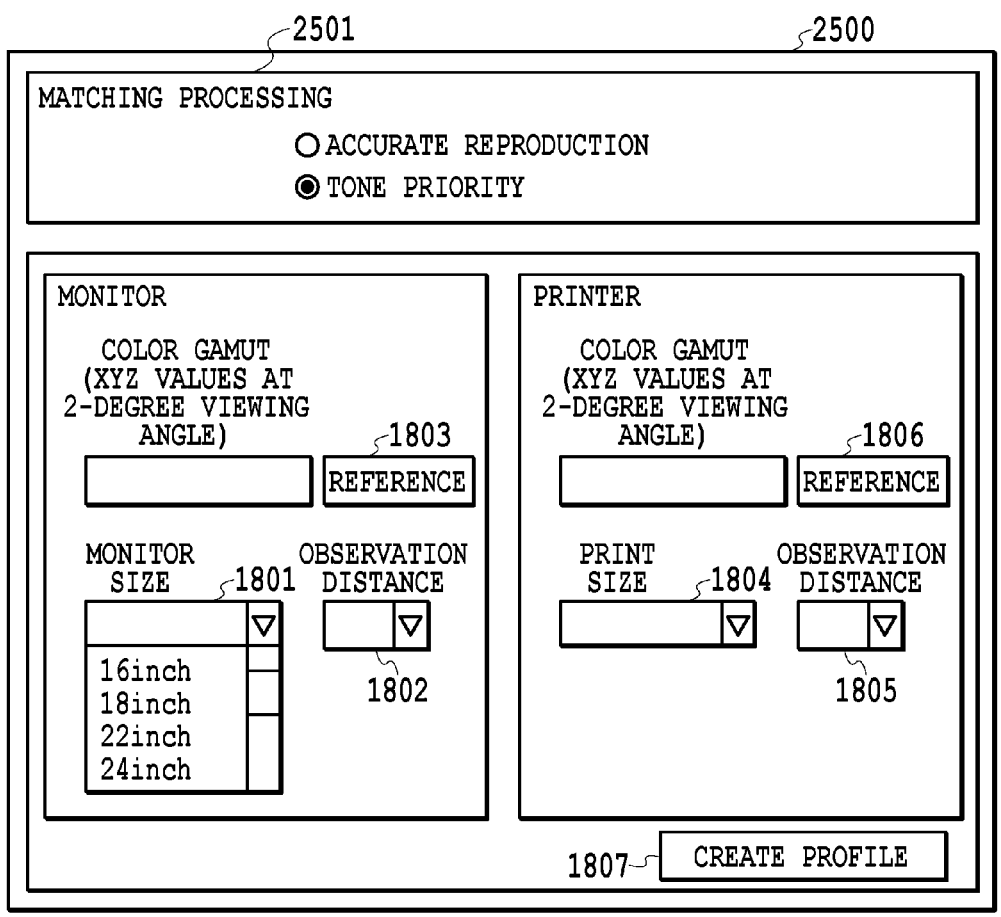
FIG. 25 is a diagram illustrating an example of a UI in Embodiment 5.

FIG. 25 is a diagram illustrating a UI 2500 displayed on the monitor 206 in a case of outputting an output image by the printer. The UI 2500 shown in FIG. 25 is different from the UI 1800 shown in FIG. 18 in displaying a selection check box 2501 for matching processing. As a specific method of specification, the user uses the UI 2500 shown in FIG. 25 to specify and select matching processing in the selection check box 2501 for the matching processing. Thus, selection of the processing can be realized.

As described above, in this embodiment, in a case where a gap of the color gamut between the devices is increased as a result of the color gamut correction, the correction processing can be controlled not to be applied. According to this embodiment, the color matching processing can be realized, which prioritizes the maintenance of the tone and enables adaptive switching of the color gamut correction processing. Moreover, the color gamut correction can be adaptively performed for any purpose by enabling switching of whether or not to perform such control.

Embodiment 6

In Embodiments 1 to 5, the description is given of the example where the color correction is performed depending on the viewing angle. Also, in the above description, it is assumed that the viewing angle is obtained based on the size of the observation target and the observation distance. However, the colors perceived by humans vary not only with the size of a region where similar colors are gathered but also with the shape. Therefore, in Embodiment 6, description is given of an example where color correction is performed in consideration of the shape of the observation target.

Figure 26:
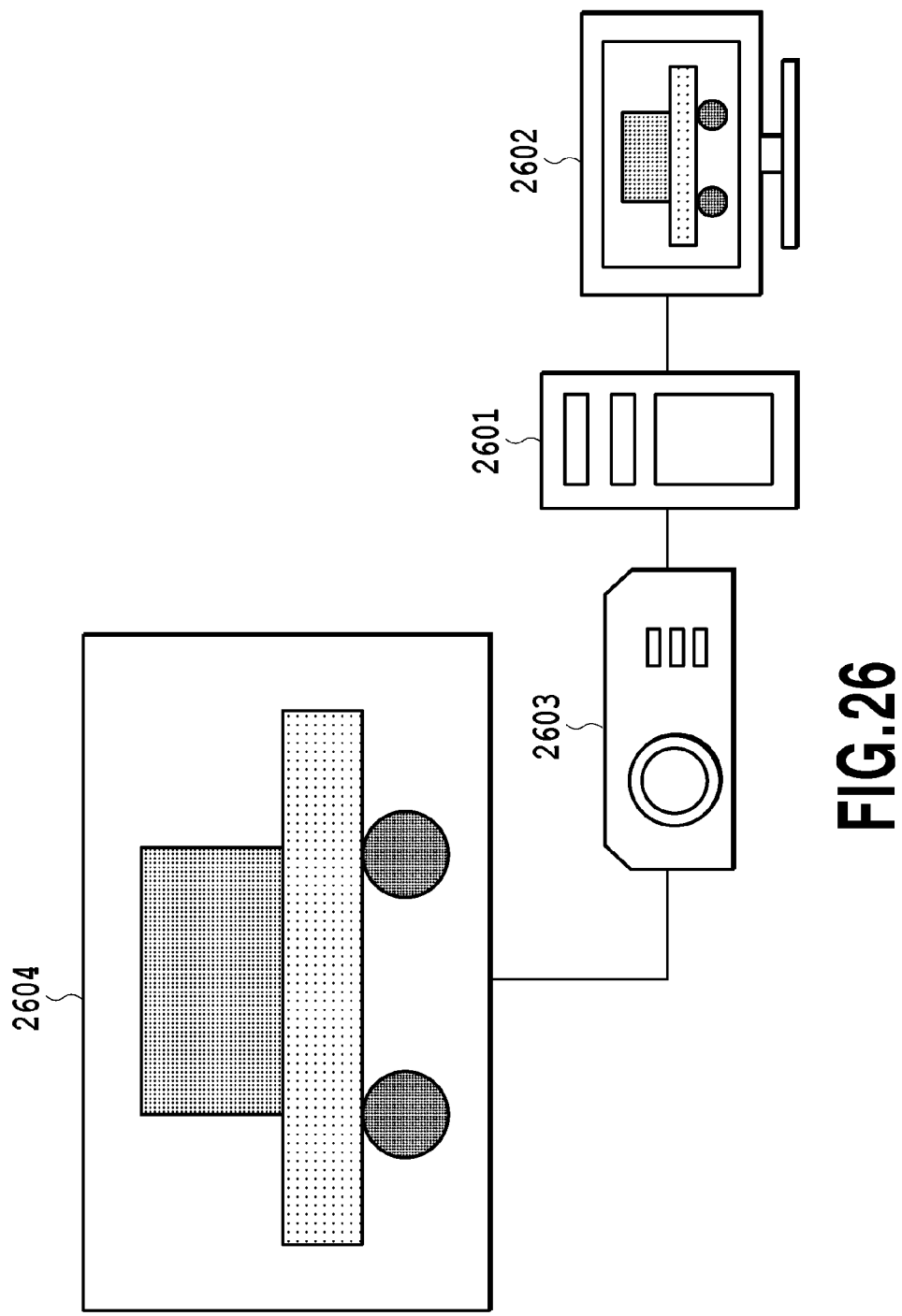
FIG. 26 is a diagram showing an image processing apparatus, a monitor, a projector and a screen according to Embodiment 6.

Processing described in Embodiment 6 is executed by a computer program on an image processing apparatus 2601 shown in FIG. 26. In this embodiment, it is assumed that the color hue of contents such as a digital cinema, which is eventually projected on to the screen 2604 by the projector 2603, is edited through simulation on the monitor 2602. This is because there is no environment of large-screen projection at hand or editing is hard to perform on the large screen. In this event, if the monitor 2602 and the projector 2603 are calibrated to equalize the colorimetric values, actual color hues thereof vary due to an area effect. As a result, desired colors cannot be obtained in final projection by the projector 2603. Therefore, by displaying, on the monitor, an image subjected to color correction in consideration of the area effect, the color hue on the projector 2603 can be simulated on the monitor 2602. More specifically, in this embodiment, description is given of an example where the monitor 2602 that is an output device displays an image corrected so as to match the color hue of the image on the projector 2603 to be a target output device. Note that, although the image processing apparatus 2601 and the projector 2603 are connected to each other in FIG. 26, the both need to be neither connected nor located in the same place.

Figure 27:
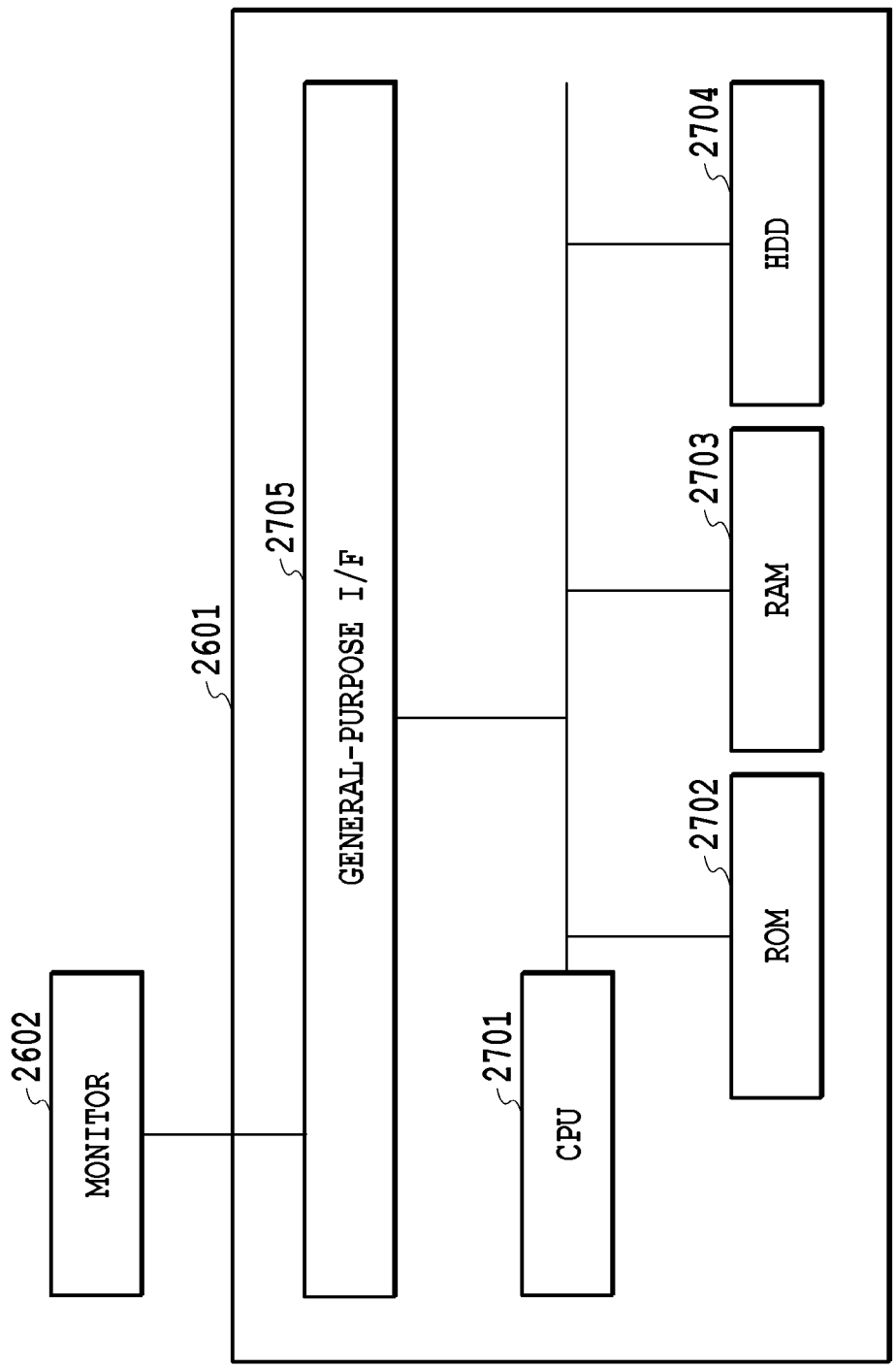
FIG. 27 is a diagram showing a hardware configuration according to Embodiment 6.

With reference to a block diagram shown in FIG. 27, description is given of a hardware configuration of the image processing apparatus according to this embodiment. The image processing apparatus 2601 includes a CPU 2701, a ROM 2702, a RAM 2703, a HDD 2704 and a general-purpose interface (I/F) 2705. The CPU 2701 controls a connected external device through the RAM 2703, the HDD 2704 and the general-purpose I/F 2705 according to a control program, an operating system, an application program, a device driver and the like, which are stored in the ROM 2702. The RAM 2703 is a work area and a temporal retreat area for various control programs. The monitor 2602 is a display device which allows the image processing apparatus 2601 to control colors of an image to be displayed.

Figure 28:
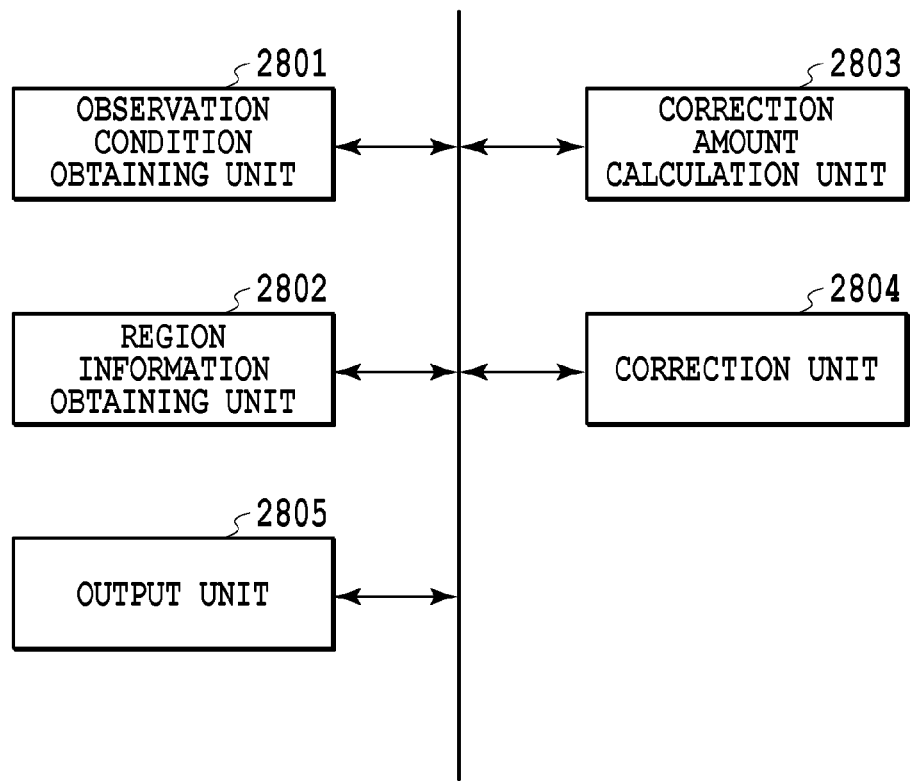
FIG. 28 is a diagram showing blocks related to color correction in the image processing apparatus according to Embodiment 6.

FIG. 28 is a diagram showing a block configuration of a module configured to perform color correction processing according to Embodiment 6. The image processing apparatus includes an observation condition obtaining unit 2801, a region information obtaining unit 2802, a correction amount calculation unit 2803, a correction unit 2804 and an output unit 2805.

<Operations in Image Processing Apparatus 2601>

Figure 29:
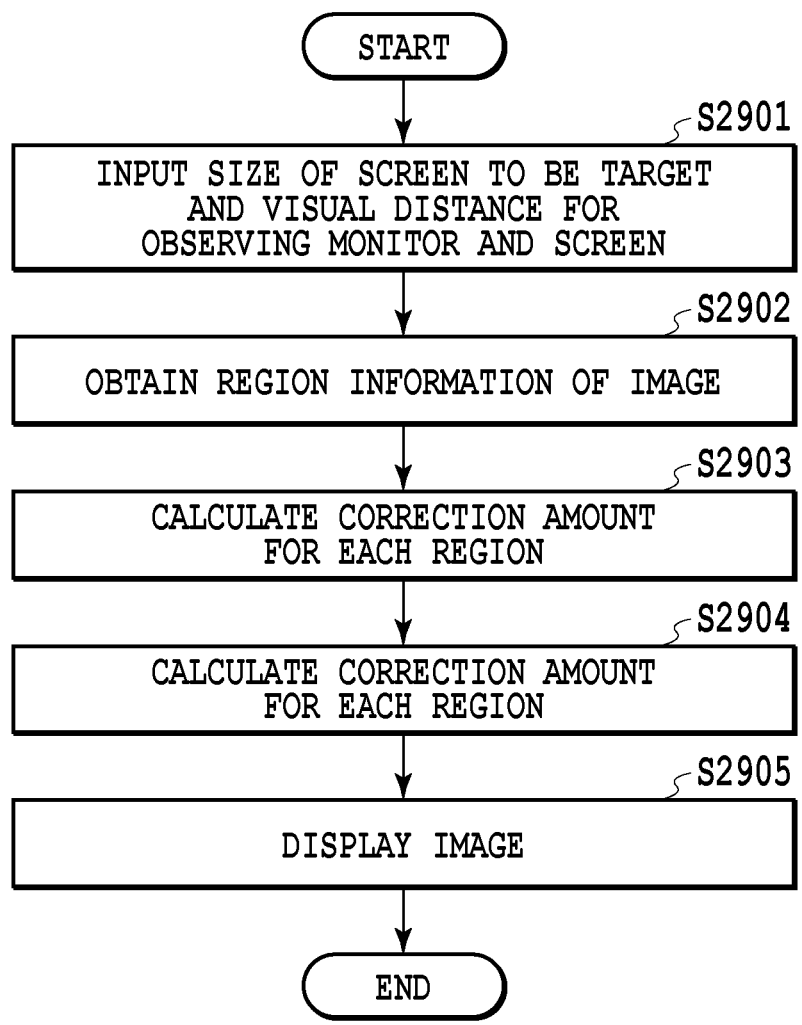
FIG. 29 is a flowchart of processing according to Embodiment 6.

With reference to the block diagram shown in FIG. 28 and a flowchart shown in FIG. 29, description is given of details of processing executed in the image processing apparatus 2601 according to this embodiment. Note that a program for controlling colors of an image to be displayed on the monitor 2602 is installed on the image processing apparatus 2601. The following operations are controlled by the program.

In Step S2901, the observation condition obtaining unit 2801 obtains observation information indicating an observation condition in observation of the screen 2604 and an observation condition in observation of the monitor 2602. Here, the observation condition obtaining unit 2801 allows the user to input the size (a short side length and an aspect ratio) and a visual distance of the screen 2604 and a visual distance of the monitor 2602. For this user input, a user interface as shown in FIG. 30 is used, for example. Here, as to the size of the screen 2604, another form such as an aspect ratio and a diagonal length may be used as long as the lengths of the horizontal and vertical sides can be specified. Moreover, in a case where the image processing apparatus 2601 and the projector 2603 are connected, the information other than the visual distance may be automatically obtained rather than being inputted by the user.

In Step S2902, the region information obtaining unit 2802 obtains region information of each object in an image from image data to be outputted. The region information may be labeled to determine which object includes pixels in the image. Alternatively, the image itself may be expressed by data such as the graphic kind, size and coordinates of each object. Note that the image data in this embodiment includes the region information of each object in the image.

In Step S2903, the correction amount calculation unit 2803 uses the region information obtained in Step S2902 to calculate a color correction amount of each object. Note that this processing is described in detail later.

In Step S2904, the correction unit 2804 uses the correction amount obtained in Step S2903 to perform color correction of each object. In this embodiment, correction coefficients representing the correction amount are values to be applied to tristimulus values XYZ, and the correction coefficients of the X value, Y value and Z value are expressed as $\alpha_{S,S'}^X$, $\alpha_{S,S'}^Y$, $\alpha_{S,S'}^Z$, respectively. First, device RGB values on the monitor 2602 are converted into the tristimulus values XYZ. This conversion is performed as shown in the following expressions with $\gamma$ representing gamma of the monitor and a 3·3 conversion matrix M.

$$R_{linear} = \left(\frac{R}{255}\right)^{\gamma}$$

$$G_{linear} = \left(\frac{G}{255}\right)^{\gamma}$$

$$B_{linear} = \left(\frac{B}{255}\right)^{\gamma} \quad \text{(Expression 4)}$$

$$\begin{pmatrix} X \\ Y \\ Z \end{pmatrix} = M \begin{pmatrix} R_{linear} \\ G_{linear} \\ B_{linear} \end{pmatrix} \quad \text{(Expression 5)}$$

Note that, in a case where a color space of the monitor is sRGB, $\gamma$ and M take the following values.

$$\gamma = 2.2 \quad \text{(Expression 6)}$$

$$M = \begin{pmatrix} 0.4124 & 0.3576 & 0.1805 \\ 0.2126 & 0.7152 & 0.0722 \\ 0.0193 & 0.1192 & 0.9505 \end{pmatrix} \quad \text{(Expression 7)}$$

In a case of another color space, $\gamma$ and M may take values that can properly represent a relationship between the device RGB values and the tristimulus values XYZ. The values can be obtained by actually measuring a color displayed by the device RGB values. With X, Y and Z obtained as shown in the above expression, tristimulus values X', Y' and Z' after correction of an area effect in consideration of the shape of the object are calculated as shown in the following expression.

$$X' = \alpha_{x,x'}^X \cdot X$$

$$Y' = \alpha_{x,x'}^Y \cdot Y$$

$$Z' = \alpha_{x,x'}^Z \cdot Z \quad \text{(Expression 8)}$$

Since the tristimulus values after correction are obtained by the above expression, image data after correction is created using the tristimulus values. In other words, image data to be outputted to the monitor 2602 is generated by converting the tristimulus values after correction into device RGB values. Note that, although the correction is performed by multiplying the original tristimulus values in this embodiment, the mode of correction does not have to be limited thereto. The device RGB values after correction can be converted as shown in the following expressions with the conversion matrix and gamma used in Expressions 4 and 5.

$$\begin{pmatrix} R'_{linear} \\ G'_{linear} \\ B'_{linear} \end{pmatrix} = M^{-1} \begin{pmatrix} X' \\ Y' \\ Z' \end{pmatrix} \quad \text{(Expression 9)}$$

$$R' = 255 \cdot (R'_{linear})^{\frac{1}{\gamma}}$$

$$G' = 255 \cdot (G'_{linear})^{\frac{1}{\gamma}}$$

$$B' = 255 \cdot (B'_{linear})^{\frac{1}{\gamma}} \quad \text{(Expression 10)}$$

In Step S2905, the output unit 2805 displays the image data created in Step S2904 on the monitor 2602. Note that, although the processing ends here in a case of a still image, Steps S2902 to S2905 are repeated for each frame in a case of a video.

<Correction Amount Calculation Method>

Figure 31:
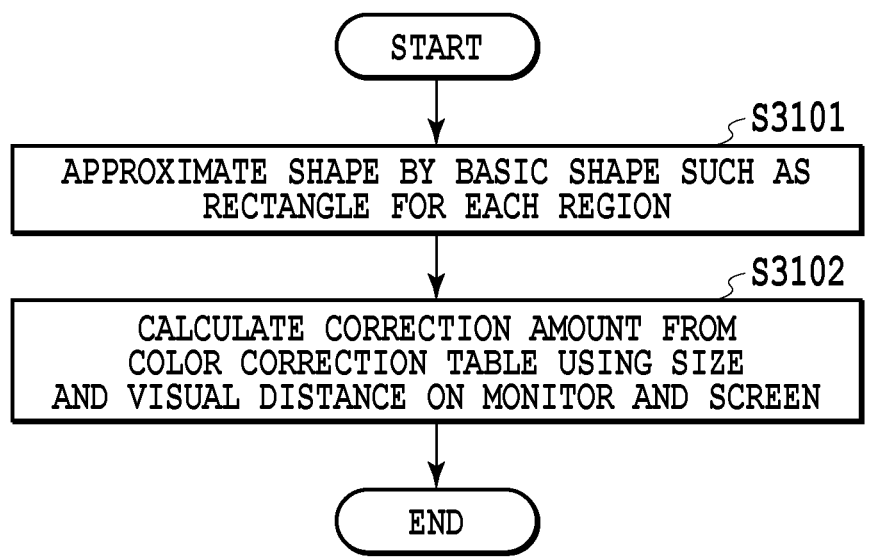
FIG. 31 is a flowchart of correction amount calculation according to Embodiment 6.
Figure 32A:
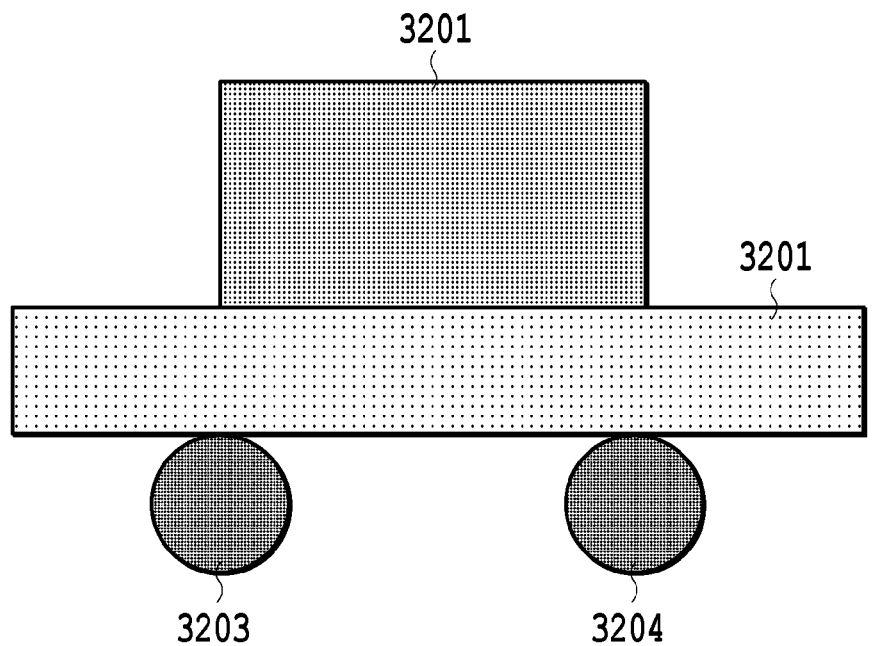
FIGS. 32A and 32B are diagrams showing an example of an image displayed on the monitor according to Embodiment 6 and an example where an object is approximated by an ellipse.
Figure 32B:
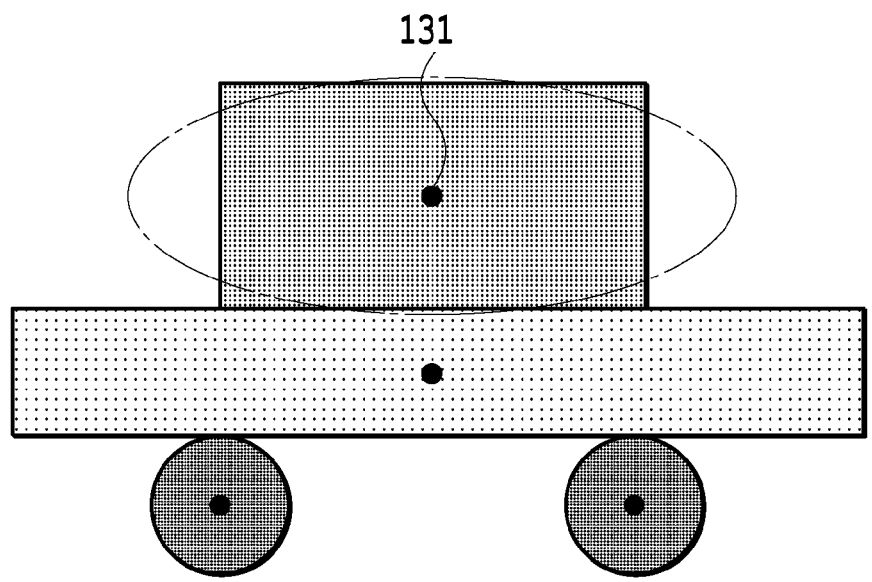

With reference to a flowchart shown in FIG. 31, detailed description is given of a method of the correction amount calculation in Step S2903. In Step S3101, the correction amount calculation unit 2803 approximates each object on the image displayed on the monitor 2602 by a basic shape such as a rectangle and an ellipse, and determines the optimum approximation. FIG. 32A shows an image displayed on the monitor 2602 in an example where the image includes four objects: an object 3201, an object 3202, an object 3203 and an object 3204. In a case where the rectangular object 3201 shown in the upper part of FIG. 32A is approximated by an ellipse, the object is approximated by an ellipse indicated by the dotted line as shown in FIG. 32B as a result. The approximation by each basic shape is described in detail later. Note that, by the approximation processing in Step S3101, the type i of the basic shape (e.g., a rectangle, an ellipse and the like) used for approximation of each object and an area S of the basic shape are determined. In other words, the approximation processing in Step S3101 can be said to be object shape information obtaining processing for obtaining object shape information.

Figure 34:
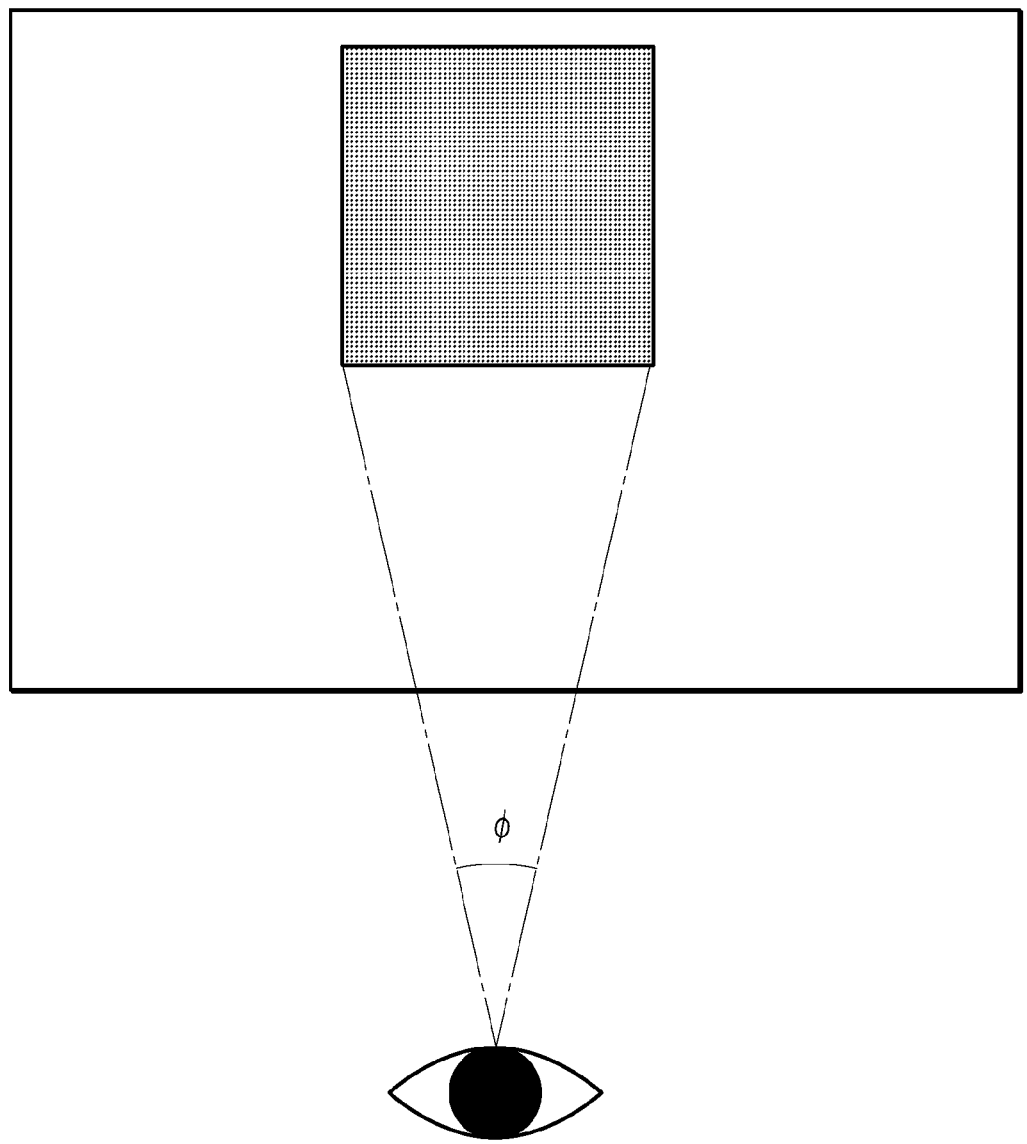
FIG. 34 is a diagram showing a viewing angle according to Embodiment 6.

In Step S3102, the correction amount calculation unit 2803 calculates a correction amount from the color correction table. More specifically, the correction amount calculation unit 2803 uses the size and visual distance of the screen 2604 and the visual distance of the monitor 2602, which are obtained in Step S2901, and the type i of the basic shape and the area S of the basic shape, which are obtained in Step S3101, to calculate the correction amount from the color correction table. A program to perform the processing of this embodiment includes a table in which correction coefficients corresponding to the viewing angle, the type i of the basic shape and the aspect ratio of the basic shape are stored as shown in FIG. 33. Here, a viewing angle $\phi$ of each object on the monitor 2602 represents an angle in a case where the length of one side of a square having the same area as that of the basic shape is viewed at a predetermined observation distance, as shown in FIG. 34. The viewing angle $\phi$ can be calculated as follows from the area S of the object on the monitor 2602 and a visual distance l between the observer and the monitor 2602.

$$\phi = 2\tan^{-1}\frac{\sqrt{S}}{2l} \qquad \text{(Expression 11)}$$

A viewing angle $\phi'$ of the object on the screen 2604 can be similarly calculated by obtaining an area of the object on the screen 2604 with the lengths of the short sides of the monitor 2602 and the screen 2604. More specifically, the area of the same object on the screen 2604 as that in the image on the monitor 2602 can be obtained based on a ratio of the short side of the monitor 2602 to the short side of the screen 2604. Then, the viewing angle of the object on the screen 2604 can be obtained by applying the obtained area of the object and the visual distance between the screen 2604 and the observer to Expression 11. Note that the short side of the monitor 2602 has a given length.

Note that the correction coefficients stored in the table in FIG. 33 are those for a 2-degree view square. More specifically, the top row of the table shown in FIG. 33 shows correction coefficients for correcting the 2-degree view square to a 3-degree view rectangle (a square since the aspect ratio is 1:1). Therefore, in order to calculate the correction coefficients so that how the image is viewed on the monitor 2602 matches how the image is viewed on the screen 2604, the following correction coefficients are required. More specifically, both of correction coefficients for correcting the 2-degree view square to the object on the monitor 2602 and correction coefficients for correcting the 2-degree view square to the object on the screen 2604 are required. Thus, the correction coefficients corresponding to the viewing angle $\phi$ on the monitor 2602 and the viewing angle $\phi'$ on the screen 2604 are obtained from the table. Assuming that the a correction coefficient of tristimulus values X, Y and Z corresponding to the viewing angle $\phi$ are $\alpha_{2,S}^{X}, \alpha_{2,S}^{Y}, \alpha_{2,S}^{Z}$ and a correction coefficient of tristimulus values X, Y and Z corresponding to the viewing angle $\phi'$ are $\alpha_{2,S'}^{X}, \alpha_{2,S'}^{Y}, \alpha_{2,S'}^{Z}$, the correction coefficients $\alpha_{S,S'}^{X}, \alpha_{S,S'}^{Y}, \alpha_{S,S'}^{Z}$ between the monitor 2602 and the screen 2604 are calculated as follows.

$$\alpha_{S,S'}^{X} = \frac{\alpha_{2,S'}^{X}}{\alpha_{2,S}^{X}} \qquad \text{(Expression 12)}$$

$$\alpha_{S,S'}^{Y} = \frac{\alpha_{2,S'}^{Y}}{\alpha_{2,S}^{Y}}$$

$$\alpha_{S,S'}^{Z} = \frac{\alpha_{2,S'}^{Z}}{\alpha_{2,S}^{Z}}$$

Note that, if the corresponding correction amount is not stored in the table, a value having the closest aspect ratio, for example, is used. For example, in a case of obtaining a correction coefficient of a rectangle having an area of 3 cm$^2$ and an aspect ratio of 1:3, a correction coefficient of 1:4 included in the table shown in FIG. 33 can be used. Also, interpolation or the like may be performed using those having the aspect ratio of 1:1 and 1:4. For example, if the aspect ratio is 1:3.7 and, as to the correction coefficients for Y, the correction coefficient with the aspect ratio 1:1 is 1.0 and the correction coefficient with the aspect ratio 1:4 is 0.97 as shown in the table of FIG. 33, the correction amount is obtained as follows.

$$\frac{(4-3.7)\cdot 1.0 + (3.7-1)\cdot 0.97}{4-1} = 0.973 \qquad \text{(Expression 13)}$$

Note that, although the correction amount is held in the form of the coefficient in the table in this embodiment, the mode of holding the correction amount does not have to be limited thereto.

<Method of Approximation by Basic Shape>

Figure 35:
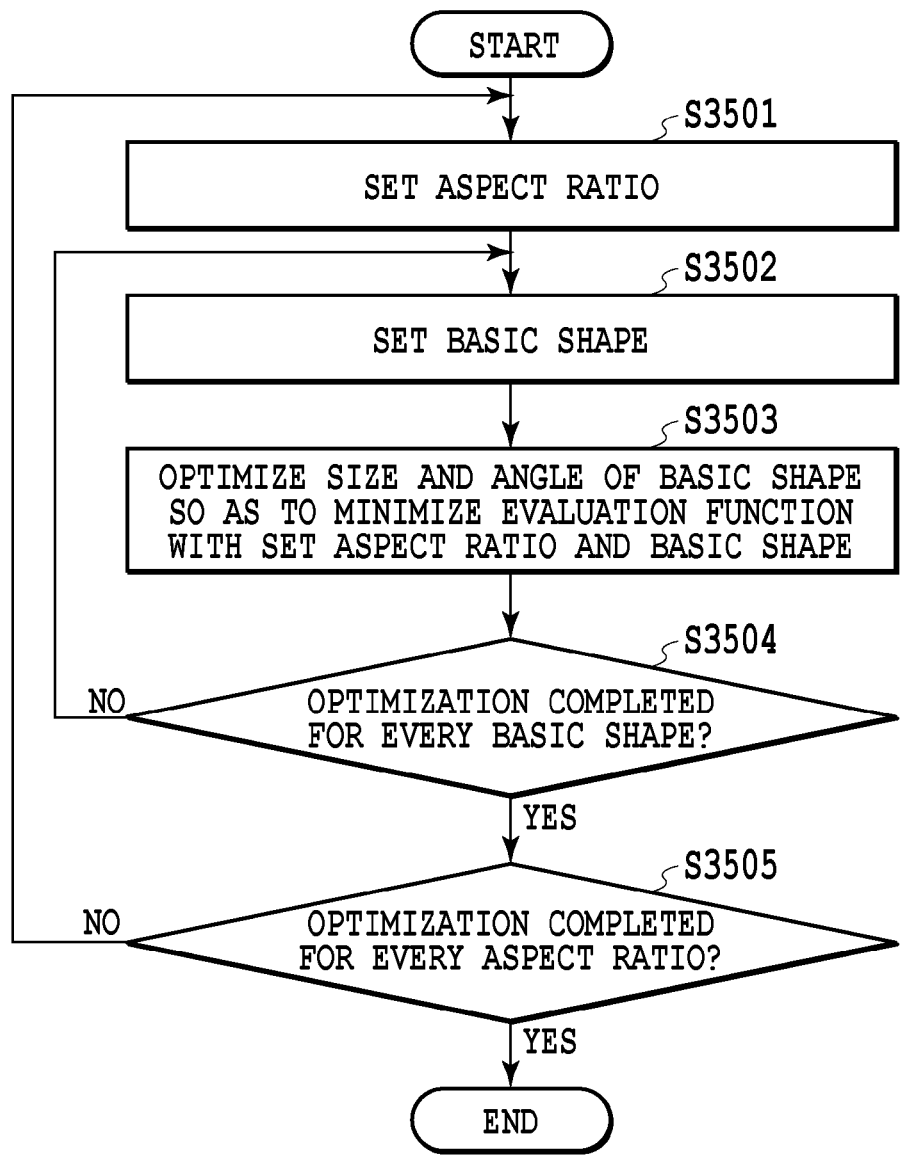
FIG. 35 is a flowchart of processing of approximating the object according to Embodiment 6.

Next, with reference to a flowchart shown in FIG. 35, description is given of a method of approximation using the basic shape in Step S3101. In Step S3501, the correction amount calculation unit 2803 sets an aspect ratio of the basic shape. For example, in a case of performing approximation using the basic shape for the aspect ratios of 1:1, 1:4 and 1:9, the aspect ratio of 1:1 is set if it is the first time to reach this step. If it is the second time or thereafter to reach this step, the current aspect ratio is confirmed, and the aspect ratio is switched to 1:4 if the current aspect ratio is 1:1 or to 1:9 if the current aspect ratio is 1:4. In this embodiment, the description is given of the example of approximation using the above aspect ratios as an example. However, the aspect ratios do not have to be limited to those described above.

In Step S3102, the correction amount calculation unit 2803 sets a rectangle as the type of the basic shape. For example, in a case of performing approximation using a rectangle, an ellipse or a triangle, the basic shape is set to the rectangle if it is the first time to reach this step. If it is the second time or thereafter to reach this step, the current basic shape is confirmed, and the basic shape is switched to the ellipse if the current basic shape is the rectangle or to the triangle if the current basic shape is the ellipse. In this embodiment, the description is given of the example of approximation using the above basic shapes as an example. However, the basic shapes do not have to be limited to those described above.

In Step S3503, the correction amount calculation unit 2803 optimizes the size and angle of the basic shape so as to minimize a value of an evaluation function in the aspect ratio and basic shape set in Steps S3501 and S3502. Note that the basic shape is located at a position where the center of gravity of the object coincides with the center of gravity of the basic shape. This processing is performed by using the sum of squares of a difference in pixel value between an image I1 having a pixel value of 1 in a region where the object is present and the other pixel value of 0 and an image I2 having a pixel value of 1 in a region where the basic shape is present and the other pixel value of 0, as the evaluation function, and by minimizing the value of the evaluation function. It is assumed that the pixel value at coordinates (x, y) of the image I2 corresponding to the basic shape in a case where the pixel value at coordinates (x, y) of the image I1 is I1(x, y), the type of the basic shape is i, the area of the basic shape is S and the rotation angle of the basic shape is θ is I2(x, y, i. S, θ). Then, the evaluation function E is expressed as follows.

$$E = \sum_{x=0}^{h-1} \sum_{y=0}^{w-1} (I_1(x, y) - I_2(x, y, i, S, \theta))^2 \quad \text{(Expression 14)}$$

Here, w and h represent the numbers of pixels in lateral and longitudinal directions of the image. Since E in the above expression can be partially differentiated by S and θ, S and θ that minimize E can be obtained by an optimization method such as a steepest descent method. Note that the basic shapes do not have to be limited to those described above. Moreover, the approximation method using the basic shape does not have to be limited to that described above.

In Step S3504, the correction amount calculation unit 2803 determines whether or not the optimization of the size and angle of the basic shape is completed for every basic shape for the currently set aspect ratio. If the optimization is completed, the processing advances to Step S3505. If not, the processing advances to Step S3502.

In Step S3505, the correction amount calculation unit 2803 determines whether or not the optimization of the size and angle of the basic shape is completed for every aspect ratio. If the optimization is completed, i, S, θ that minimize E among i. S, θ obtained up to this point are recorded. Then, the processing advances to Step S3102 after terminating the processing shown in FIG. 35. If not, the processing advances to Step S3501. The type i and area S of the basic shape that minimize the evaluation function E become information indicating he shape of the object to be a target of approximation.

As described above, in Embodiment 6, the description is given of the example where the shape of the object is estimated from the region information of each object in the image and the color hue in a case of large-screen projection by the projector is simulated on the monitor. According to this embodiment, since the color hue in a case of large-screen projection can be simulated on the monitor, there is achieved an effect of realizing a desired color hue in final projection by the projector.

Embodiment 7

In Embodiment 6, the description is given of the processing assuming input of an image including region information of each object such as CG. In this embodiment, description is given of a method for correcting a change in color hue due to an area effect even in a case where image data including no region information of each object such as a general bit map image, without being limited to CG or the like. Note that, as in the case of Embodiment 6, the color hue in a case of large-screen projection on the screen is simulated on the monitor. Since a hardware configuration in this embodiment is the same as that in Embodiment 6, description thereof is omitted.

Figure 36:
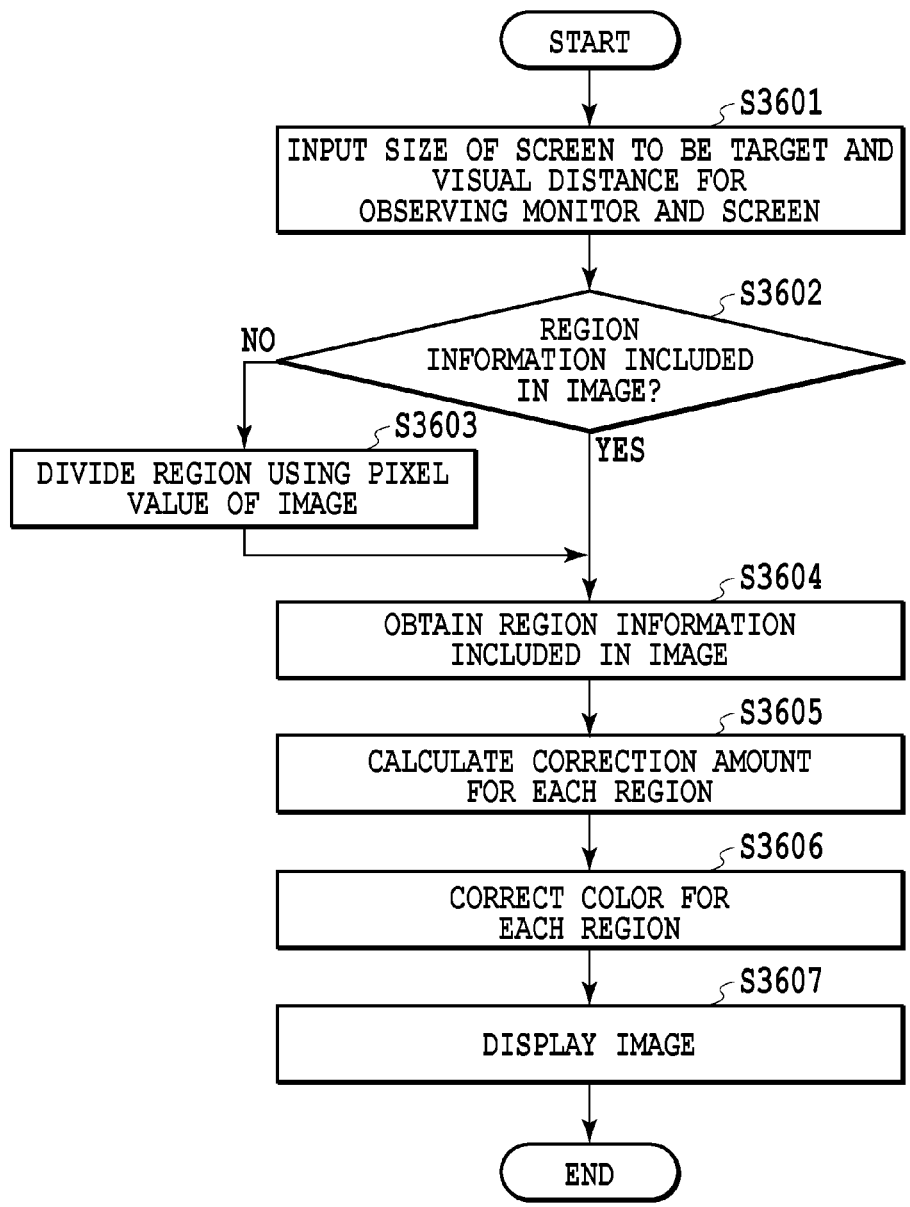
FIG. 36 is a flowchart of processing according to Embodiment 7.

With reference to a flowchart shown in FIG. 36, detailed description is given of processing executed by the image processing apparatus 2601 in this embodiment. In Step S3601, the observation condition obtaining unit 2801 obtains information indicating an observation condition by allowing a user to input the size of the screen to be a target and a visual distance for observing the monitor and the screen, as in the case of Step S2901 in Embodiment 6.

In Step S3602, the region information obtaining unit 2802 determines whether or not the image data to be outputted includes object region information. In a case of image data, such as CG, including the object region information, the processing advances to Step S3604. On the other hand, in a case of image data, such as bit map image data, including no region information, the processing advances to Step S3603.

In Step S3603, the region information obtaining unit 2802 uses information of a pixel value in the image data to perform region division, thereby obtaining region information in the image data. For the region division of the image, k-means, graph cut or the like is used. This processing is described in detail later.

Since processing from Step S3604 to Step S3607 is the same as the processing from Step S2902 to Step S2905 in Embodiment 6, description thereof is omitted here.

<Region Division Method>

Figure 37:
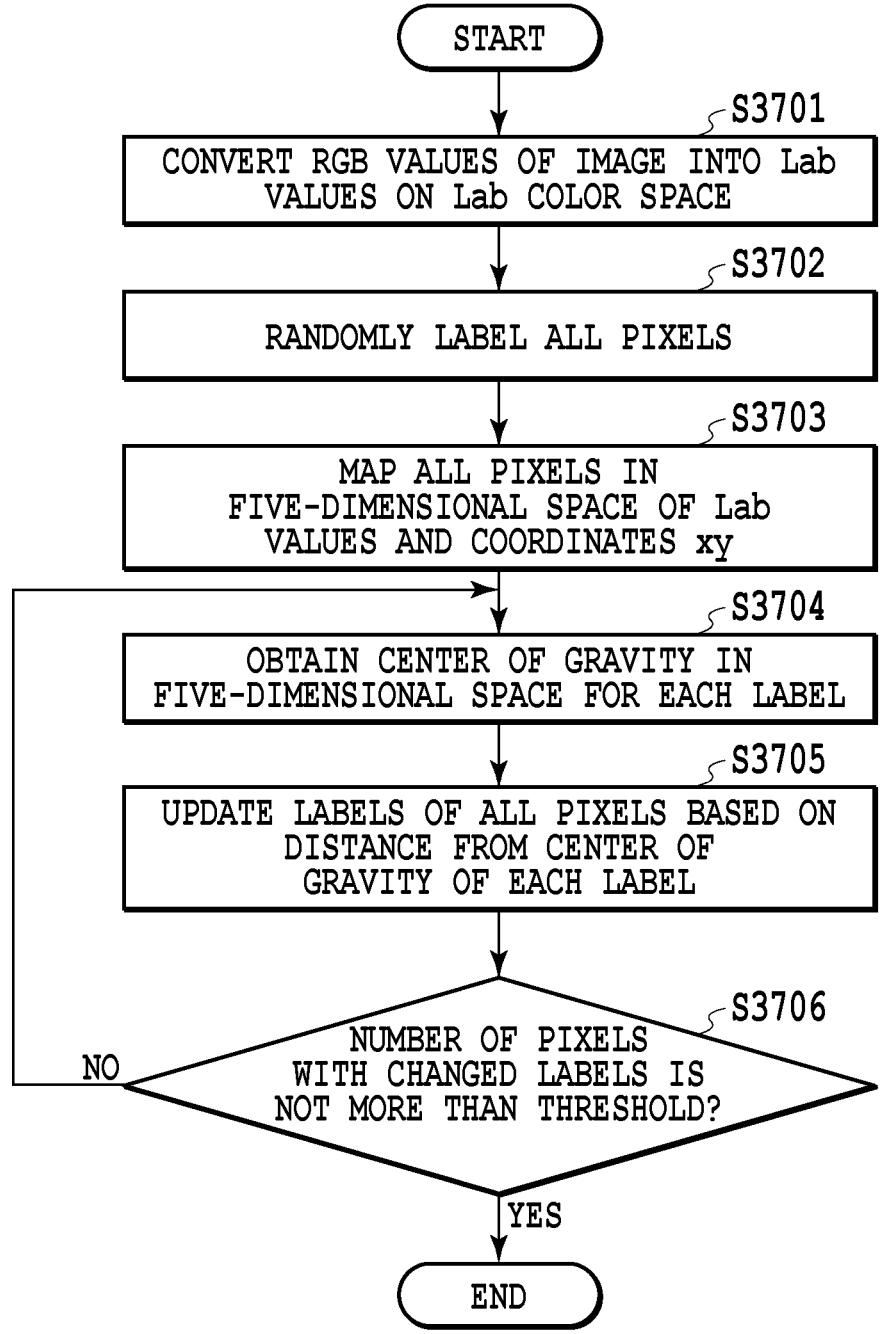
FIG. 37 is a diagram showing details of region division processing according to Embodiment 7.

With reference to a flowchart shown in FIG. 37, detailed description is given of the processing in Step S3603 in the flowchart shown in FIG. 36. In Step S3701, the region information obtaining unit 2802 converts RGB values of the image data into Lab values on a Lab color space. In this conversion, the RGB values are first converted into tristimulus values XYZ and then into the Lab values. A method of conversion from RGB to XYZ is the same as that described in Step S2904 in Embodiment 6. The conversion from the tristimulus values XYZ to the Lab values is performed as shown in the following expressions.

$$L* = 116 f\left(\frac{Y}{Y_n}\right) - 16 \quad \text{(Expression 15)}$$
$$a* = 500\left[f\left(\frac{X}{X_n}\right) - f\left(\frac{Y}{Y_n}\right)\right]$$
$$b* = 200\left[f\left(\frac{Y}{Y_n}\right) - f\left(\frac{Z}{Z_n}\right)\right]$$

$$f(t) = \begin{cases} t^{\frac{1}{3}} & t > \left(\frac{6}{29}\right)^3 \\ \frac{1}{3}\left(\frac{29}{6}\right)^2 t + \frac{4}{29} & t \le \left(\frac{6}{29}\right)^3 \end{cases} \quad \text{(Expression 16)}$$

Here, $X_n$, $Y_n$ and $Z_n$ are tristimulus values of a color displayed as R=255, G=255 and B=255 on the monitor 2603. Note that, in this embodiment, description is given of a region division method using k-means on the Lab color space. However, another color space such as Luv may be used.

In Step S3702, the region information obtaining unit 2802 randomly labels all pixels. In a case where the image is wished to be divided into k objects, random numbers are generated for the number of pixels, and values from 0 to k−1 in a remainder left after dividing the random numbers by k are assigned as labels to the respective pixels. Note that the value of k may be determined by the user or automatically determined from the image.

In Step S3703, the region information obtaining unit 2802 performs mapping of all the pixels in a five-dimensional space of the Lab values and coordinates xy. In this event, normalization is performed to match the magnitudes of the Lab values and the coordinates xy. Assuming that a height of the image is h and a width thereof is w, mapping at a point p in the five-dimensional space is performed as shown in the following expression, for example.

$$p = \left(L*, a, *b*, \frac{100cx}{w}, \frac{100cy}{h}\right) \quad \text{(Expression 17)}$$

Here, c is a parameter for determining how much the color and coordinates are to be emphasized.

In Step S3704, the region information obtaining unit 2802 obtains the center of gravity of each label in the five-dimensional space. Assuming that a set of points of a label j (0≤j≤k−1) is $P_j$, the number of elements in the set $P_j$ is $n_k$, the center of gravity g (j) is obtained as follows.

$$g(j) = \frac{1}{n_k} \sum_{p \in P_j} p \quad \text{(Expression 18)}$$

In Step S3705, the region information obtaining unit 2802 updates the labels of all the pixels based on a distance from the center of gravity of each label obtained in Step S3704. For all the pixels, the square $l_j^2$ of a Euclidean distance from the center of gravity of each label is obtained as follows.

$$l_j^2 = g(j) \cdot p \quad \text{(Expression 19)}$$

After the square $l_j^2$ of the Euclidean distance from the center of gravity of each label is obtained, j taking the minimum value is assigned to the pixel as a new label.

In Step S3706, the region information obtaining unit 2802 checks the number of pixels whose labels are changed. If the number of such pixels is larger than a threshold, the processing returns to Step S3704 and repeated. On the other hand, if the number of the pixels whose labels are changed is not more than the threshold or if the processing is repeated for a predetermined number of times, the processing advances to Step S3603 after terminating the processing shown in FIG. 37.

In this embodiment, the description is given of the region division method using k-means. However, the region division may be performed using other methods, such as graph cut.

In Embodiment 7, the description is given of the example where, in a case that the image includes no region information of each object, the color hue in a case of large-screen projection by the projector is simulated on the monitor by performing the region division processing. According to this embodiment, also for the bit map image, the color hue in a case of large-screen projection is simulated on the monitor. Thus, there is achieved an effect of realizing a desired color hue in a case where the image is finally projected by the projector.

OTHER EMBODIMENTS

In Embodiments 6 and 7, the description is given of the example where the color hue of the image projected on a large screen by the projector is simulated on the monitor. However, in a case of correcting a change in color hue due to an area effect, the combination of the devices does not have to be limited to the above example. For example, it is also conceivable that the color hue of a poster to be printed with A0 size is simulated with L-size print. Also in this case, color correction is performed using a computer program operated on an image processing apparatus, such as a printer driver, as in the case of the embodiments. However, unlike the monitor, the printer cannot convert the device RGB values into the tristimulus values XYZ by using the conversion matrix and gamma. Therefore, it is required to perform the conversion using a method such as tetrahedral interpolation using a look-up table instead. The other processing is the same as those in Embodiments 6 and 7.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-219135, filed on Oct. 22, 2013, and Japanese Patent Application No. 2014-082621, filed on Apr. 14, 2014, which are hereby incorporated by reference herein in its entirety.

What is claimed is:

1. An image processing apparatus that adjusts a color of image data, comprising:
    an obtaining unit configured to obtain a viewing angle of a first observation target and a viewing angle of a second observation target; and
    a color correction unit configured to perform correction of colors of image data representing the observation targets by using the viewing angle of the first observation target and the viewing angle of the second observation target which are obtained by the obtaining unit, wherein
    the color correction unit performs the correction using correction parameters corresponding to the viewing angles, and
    the color correction unit converts a colorimetric value obtained by measuring the color of the first observation target with a measuring method using 2 degrees or 10 degrees as a measuring viewing angle, the measured colorimetric value being converted by using
    a first color correction parameter obtained from a correction parameter corresponding to the viewing angle for the measuring method using 2 degrees or 10 degrees as a measuring viewing angle and a correction parameter corresponding to the viewing angle of the first observation target,
    a second color correction parameter obtained from the correction parameter corresponding to the viewing angle of the first observation target and a correction parameter corresponding to the viewing angle of the second observation target, and
    a third color correction parameter obtained from the correction parameter corresponding to the viewing angle of the second observation target and the correction parameter corresponding to the viewing angle for the measuring method using 2 degrees or 10 degrees as a measuring viewing angle.

2. The image processing apparatus according to claim 1, wherein
    the first color correction parameter is a parameter for converting the colorimetric value into a chromaticity value of a color perceived in observation at the viewing angle of the first observation target,
    the second color correction parameter is a parameter for converting the chromaticity value converted using the first color correction parameter into a chromaticity value of a color perceived at the viewing angle of the second observation target as the same color as the chromaticity value, and
    the third color correction parameter is a parameter for converting the chromaticity value converted using the second color correction parameter into a chromaticity value used for output at the viewing angle for the measuring method using 2 degrees or 10 degrees as a measuring viewing angle.

3. The image processing apparatus according to claim 1, further comprising an output unit configured to convert the chromaticity value converted using the third color correction parameter into a pixel value corresponding to an output device, and to output the pixel value, wherein,
    wherein in a case where the viewing angle of the first observation target is equal to the viewing angle of the second observation target, the output unit converts the colorimetric value obtained by color measurement with the measuring method using 2 degrees or 10 degrees as a measuring viewing angle into the pixel value corresponding to the output device, and then outputs the pixel value.

4. The image processing apparatus according to claim 1, wherein the first observation target is a captured image obtained by capturing an object and
    a colorimetric value obtained by measuring a color of the first observation target by the measuring method using 2 degrees or 10 degrees as a measuring viewing angle is obtained from the captured image.

5. The image processing apparatus according to claim 4, wherein the obtaining unit calculates the viewing angle of the first observation target based on a size of the object in the captured image and a capturing distance of the captured image.

6. The image processing apparatus according to claim 1, wherein the second observation target represents the same object as the first observation target and the second observation target is an image different in size from the first observation target.

7. The image processing apparatus according to claim 1, wherein the obtaining unit calculates the viewing angle of the second observation target based on a size indicating an object region in an output image and an observation distance for observing the output image, wherein,
    the output image is an image projected by a projector, and the observation distance is based on a projection distance of the projector, or
    the output image is a printed image, and the observation distance is based on an instruction from a user.

8. The image processing apparatus according to claim 1, wherein the color correction unit corrects at least one of a color reproduction characteristic of a first device to output the first observation target and a color reproduction characteristic of a second device to output the second observation target, depending on the viewing angle of the corresponding one of the observation targets, and
    the image processing apparatus further comprising:
    a determination unit configured to determine whether or not tone deterioration occurs in the color reproduction characteristic corrected by the color correction unit; and
    a brightness correction unit configured to correct brightness of the color reproduction characteristic determined to have the tone deterioration.

9. The image processing apparatus according to claim 8, further comprising:
    a generation unit configured to generate a conversion table for converting a color reproduced by the first device into a color reproduced by the second device, based on the color reproduction characteristic corrected by the color correction unit;
    an output unit configured to output image data by using the generated conversion table; and
    a second determination unit configured to makes determination on whether or not a difference between the color reproduction characteristics of the first and second devices, which are corrected by the color correction unit, is larger than a difference between the color reproduction characteristics of the first and second devices before the correction,
    wherein, if the former difference is not larger, the generation unit generates the conversion table.

10. The image processing apparatus according to claim 9, further comprising a selection unit capable of selecting between a mode of prioritizing reduction of a tone difference and a mode of not prioritizing reduction of the tone difference, wherein, in a case where the mode of prioritizing reduction of the tone difference is selected, the second determination unit makes the determination.

11. An image processing method of adjusting a color of image data, comprising the steps of:

obtaining a viewing angle of a first observation target and a viewing angle of a second observation target; and correcting colors of image data representing the observation targets by using the obtained viewing angle of the first observation target and the obtained viewing angle of the second observation target, wherein the correcting of colors comprises using correction parameters corresponding to the viewing angles, and a colorimetric value obtained by measuring the color of the first observation target with a measuring method using 2 degrees or 10 degrees as a measuring viewing angle, is converted by using a first color correction parameter obtained from a correction parameter corresponding to the viewing angle for the measuring method using 2 degrees or 10 degrees as a measuring viewing angle and a correction parameter corresponding to the viewing angle of the first observation target, a second color correction parameter obtained from the correction parameter corresponding to the viewing angle of the first observation target and a correction parameter corresponding to the viewing angle of the second observation target, and a third color correction parameter obtained from the correction parameter corresponding to the viewing angle of the second observation target and the correction parameter corresponding to the viewing angle for the measuring method using 2 degrees or 10 degrees as a measuring viewing angle.

12. A non-transitory computer readable storage medium storing a program which causes a computer to perform an image processing method of adjusting a color of image data, comprising the steps of:

obtaining a viewing angle of a first observation target and a viewing angle of a second observation target; and correcting colors of image data representing the observation targets by using the obtained viewing angle of the first observation target and the obtained viewing angle of the second observation target, wherein the correcting of colors comprises using correction parameters corresponding to the viewing angles, and a colorimetric value obtained by measuring the color of the first observation target with a measuring method using 2 degrees or 10 degrees as a measuring viewing angle, is converted by using a first color correction parameter obtained from a correction parameter corresponding to the viewing angle for the measuring method using 2 degrees or 10 degrees as a measuring viewing angle and a correction parameter corresponding to the viewing angle of the first observation target, a second color correction parameter obtained from the correction parameter corresponding to the viewing angle of the first observation target and a correction parameter corresponding to the viewing angle of the second observation target, and a third color correction parameter obtained from the correction parameter corresponding to the viewing angle of the second observation target and the correction parameter corresponding to the viewing angle for the measuring method using 2 degrees or 10 degrees as a measuring viewing angle.

\* \* \* \* \*